(12) United States Patent
Tian et al.

(10) Patent No.: US 12,300,136 B2
(45) Date of Patent: May 13, 2025

(54) DISPLAY METHOD AND ELECTRONIC DEVICE

(71) Applicant: HUAWEI TECHNOLOGIES CO., LTD., Guangdong (CN)

(72) Inventors: Huajian Tian, Shenzhen (CN); Hongwei Qiu, Shenzhen (CN); Jiajia Hu, Wuhan (CN); Yuanchang Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/250,937

(22) PCT Filed: Oct. 26, 2021

(86) PCT No.: PCT/CN2021/126334
§ 371 (c)(1),
(2) Date: Apr. 27, 2023

(87) PCT Pub. No.: WO2022/089407
PCT Pub. Date: May 5, 2022

(65) Prior Publication Data
US 2024/0363046 A1 Oct. 31, 2024

(30) Foreign Application Priority Data
Oct. 30, 2020 (CN) .......................... 202011188580.3

(51) Int. Cl.
*G09G 3/00* (2006.01)
*G06F 3/01* (2006.01)
(Continued)

(52) U.S. Cl.
CPC ............. *G09G 3/035* (2020.08); *G06F 3/013* (2013.01); *G09G 2340/0464* (2013.01); *G09G 2354/00* (2013.01)

(58) Field of Classification Search
CPC ....................................................... G06F 3/013
See application file for complete search history.

(56) References Cited

U.S. PATENT DOCUMENTS

| 2014/0055429 A1* | 2/2014 | Kwon ................... G06F 1/1652 345/204 |
| 2019/0107943 A1* | 4/2019 | Daioku ................. G06F 3/0482 |
| 2020/0175945 A1 | 6/2020 | Chen et al. |

FOREIGN PATENT DOCUMENTS

| CN | 106200803 A | 12/2016 |
| CN | 109495608 A | 3/2019 |

(Continued)

OTHER PUBLICATIONS

Extended European Search Report in European Appln No. 21885134.3, dated Feb. 15, 2024, 8 pages.

(Continued)

*Primary Examiner* — Nan-Ying Yang
(74) *Attorney, Agent, or Firm* — Fish & Richardson P.C.

(57) ABSTRACT

This application provides a display method and an electronic device. The method may be applied to an electronic device configured with a foldable screen. The foldable screen may also be understood as a foldable display screen. The foldable screen includes at least a first display area and a second display area. The method includes: determining the first display area as a display area at which the user gazes; adjusting a display direction of the first display area to match with a gaze direction of the user; and moving, to the display direction-adjusted first display area for display, an interface that is being presented in the second display area.

15 Claims, 22 Drawing Sheets

(51) Int. Cl.
    *G06F 3/0484*    (2022.01)
    *G06F 3/0488*    (2022.01)

(56)            References Cited

FOREIGN PATENT DOCUMENTS

| CN | 109918165 A | 6/2019 |
| CN | 110531917 A | 12/2019 |
| CN | 110780951 A | 2/2020 |
| CN | 110851067 A | 2/2020 |
| CN | 111599273 A | 8/2020 |

OTHER PUBLICATIONS

International Search Report and Written Opinion in International Appln. No. PCT/CN2021/126334, mailed on Jan. 26, 2022, 16 pages (with English translation).

\* cited by examiner

DISPLAY METHOD AND ELECTRONIC DEVICE

CROSS-REFERENCE TO RELATED APPLICATIONS

This application is a national stage of International Application No. PCT/CN2021/126334, filed on Oct. 26, 2021, which claims priority to Chinese Patent Application No. 202011188580.3, filed on Oct. 30, 2020. Both of the aforementioned applications are hereby incorporated by reference in their entireties.

TECHNICAL FIELD

This solution relates to the field of terminal technologies, and in particular, to a display method and an electronic device.

BACKGROUND

With current development of flexible screen technologies, flexible foldable touchscreens have been applied to electronic devices, so that a user can fold or expand a screen of the electronic device. This meets a user requirement for using different screen sizes. The user may divide the screen into two display areas by folding the screen, for example, folding the screen in half. When a display direction of the display area is inconsistent with a body direction of the electronic device, user experience is extremely poor. In addition, because different display areas may have different notch specifications, resolutions, and the like, when the user powers the electronic device on or switches an application between the different display areas, the application is prone to restart, unexpected exit, crash, or the like, and user experience is poor.

SUMMARY

This application provides a display method and an electronic device, to resolve a problem that an application is prone to restart, unexpected exit, crash, or the like when a user powers the electronic device on or performs screen switching.

According to a first aspect, an embodiment of this application provides a display method. The method may be applied to an electronic device configured with a foldable screen. The foldable screen may also be understood as a foldable display screen, for example, a foldable touchscreen. The foldable screen includes at least a first display area and a second display area. The first display area is a display area of the foldable screen in a folded state, and the second display area is another display area of the foldable screen in the folded state; the first display area is a display area of the foldable screen in a folded state, and the second display area is an entire display area of the foldable screen in an expanded state; or the first display area is an entire display area of the foldable screen in an expanded state, and the second display area is another display area of the foldable screen in a folded state.

The method includes: determining the first display area as a display area at which a user gazes; adjusting a display direction of the first display area to match with a gaze direction of the user; and moving, to the display direction-adjusted first display area for display, an interface that is being presented in the second display area.

In this embodiment of this application, in a scenario such as a power-on scenario or a screen switching scenario, the electronic device adjusts a display direction of a user-oriented display area based on the gaze direction of the user, so that an application interface to be presented in the first display area matches with the gaze direction of the user, and the application interface is not displayed in the display area in a display direction that is set by factory default. According to this embodiment of this application, even if the display area direction that is set by factory default is inconsistent with a body direction, display may be performed in a direction matching with the gaze direction of the user without restarting an application, so that a life cycle of the application continues, and user experience can be improved.

For example, the user watches a video in the second display area, and switches a play back interface of the video to the first display area when the video has been played for 1 minute and 30 seconds. The electronic device adjusts the display direction of the first display area to the direction matching with the gaze direction of the user, and presents the play back interface of the video at 1 minute and 30 seconds, so that a presentation direction of the playback interface matches with the gaze direction of the user, and the user can continue to watch the video in the first display area. According to the method provided in this embodiment of this application, video interruption caused by application restart, unexpected exit, or the like can be avoided, thereby improving user experience.

In a possible design, before obtaining a body direction that is of the electronic device and that is opposite to a gravity direction, the method further includes: detecting a power-on signal; detecting that the user switches the application interface from the second display area to the first display area; or detecting that the user switches the application interface from the second display area of the foldable screen to the first display area. According to the foregoing design, in a scenario such as a power-on scenario or a screen switching scenario, a phenomenon such as application restart or unexpected exit can be avoided in the electronic device, to ensure continuity of a life cycle of an application, and further improve user experience.

In a possible design, the detecting that a user-oriented display area is switched from the second display area of the foldable screen to the first display area includes: detecting that the foldable screen is switched from the expanded state to the folded state, where the second display area is an entire display area of the foldable screen in the expanded state, and the first display area is a display area of the foldable screen in the folded state; detecting that the foldable screen is switched from the folded state to the expanded state, where the second display area is a display area of the foldable screen in the folded state, and the first display area is an entire display area of the foldable screen in the expanded state; or detecting that a direction of the electronic device changes, so that the user-oriented display area is switched from the second display area to the first display area, where the second display area is a display area of the foldable screen in the folded state, and the first display area is another display area of the foldable screen in the folded state. According to the foregoing design, in a scenario such as a folding scenario, an expanding scenario, or a screen switching scenario, a phenomenon such as application restart or unexpected exit can be avoided in the electronic device, to ensure continuity of a life cycle of an application, and further improve user experience.

In a possible design, the detecting that the user switches the application interface from the second display area of the foldable screen to the first display area includes: detecting that the foldable screen is switched from the expanded state to the folded state, where the second display area is an entire display area of the foldable screen in the expanded state, and the first display area is a display area of the foldable screen in the folded state; detecting that the foldable screen is switched from the folded state to the expanded state, where the second display area is a display area of the foldable screen in the folded state, and the first display area is an entire display area of the foldable screen in the expanded state; or detecting that the user makes a specific gesture on the application interface presented in the second display interface. According to the foregoing design, the user may switch the application interface to the first display area by folding the electronic device, expanding the electronic device, making the specific gesture, or the like.

According to a second aspect, an embodiment of this application provides a display method. The method may be applied to an electronic device configured with a foldable screen. The foldable screen may also be understood as a foldable display screen, for example, a foldable touchscreen. The foldable screen includes at least a first display area and a second display area. The first display area is a display area of the foldable screen in a folded state, and the second display area is another display area of the foldable screen in the folded state; the first display area is a display area of the foldable screen in a folded state, and the second display area is an entire display area of the foldable screen in an expanded state; or the first display area is an entire display area of the foldable screen in an expanded state, and the second display area is another display area of the foldable screen in a folded state.

The method includes: determining the first display area as a display area at which a user gazes; obtaining information about a notch area of the first display area; adjusting a display area of an application interface based on the information about the notch area of the first display area, where the application interface is an interface that is being presented in the second display area, and presenting an adjusted application interface in the first display area.

In this embodiment of this application, in a scenario such as a power-on scenario or a screen switching scenario, the electronic device adjusts the display area of the application interface based on the notch area of the first display area, so that application restart, unexpected exit, or the like can be avoided, a life cycle of the application continues, and user experience can be improved.

For example, the user watches a video in the second display area, and switches a playback interface of the video to the first display area when the video has been played for 1 minute and 30 seconds. The electronic device adjusts a display area of the playback interface of the video at 1 minute and 30 seconds based on the notch area of the first display area, so that the user can continue to watch the video in the first display area. According to the method provided in this embodiment of this application, video interruption caused by application restart, unexpected exit, or the like can be avoided, thereby improving user experience.

In a possible design, before the obtaining information about a notch area of the first display area, the method further includes: detecting a power-on signal; detecting that the user switches the application interface from the second display area to the first display area; or detecting that the user switches the application interface from the second display area of the foldable screen to the first display area. According to the foregoing design, in a scenario such as a power-on scenario or a screen switching scenario, a phenomenon such as application restart or unexpected exit can be avoided in the electronic device, to ensure continuity of a life cycle of an application, and further improve user experience.

In a possible design, the detecting that a user-oriented display area is switched from the second display area of the foldable screen to the first display area includes: detecting that the foldable screen is switched from the expanded state to the folded state, where the second display area is an entire display area of the foldable screen in the expanded state, and the first display area is a display area of the foldable screen in the folded state; detecting that the foldable screen is switched from the folded state to the expanded state, where the second display area is a display area of the foldable screen in the folded state, and the first display area is an entire display area of the foldable screen in the expanded state; or detecting that a direction of the electronic device changes, so that the user-oriented display area is switched from the second display area to the first display area, where the second display area is a display area of the foldable screen in the folded state, and the first display area is another display area of the foldable screen in the folded state. According to the foregoing design, in a scenario such as a folding scenario, an expanding scenario, or a screen switching scenario, a phenomenon such as application restart or unexpected exit can be avoided in the electronic device, to ensure continuity of a life cycle of an application, and further improve user experience.

In a possible design, the detecting that the user switches the application interface from the second display area of the foldable screen to the first display area includes: detecting that the foldable screen is switched from the expanded state to the folded state, where the second display area is an entire display area of the foldable screen in the expanded state, and the first display area is a display area of the foldable screen in the folded state; detecting that the foldable screen is switched from the folded state to the expanded state, where the second display area is a display area of the foldable screen in the folded state, and the first display area is an entire display area of the foldable screen in the expanded state; or detecting that the user makes a specific gesture on the application interface presented in the second display interface. According to the foregoing design, the user may switch the application interface to the first display area by folding the electronic device, expanding the electronic device, making the specific gesture, or the like.

According to a third aspect, an embodiment of this application provides a display method. The method may be applied to an electronic device configured with a foldable screen. The foldable screen may also be understood as a foldable display screen, for example, a foldable touchscreen. The foldable screen includes at least a first display area and a second display area. The first display area is a display area of the foldable screen in a folded state, and the second display area is another display area of the foldable screen in the folded state; the first display area is a display area of the foldable screen in a folded state, and the second display area is an entire display area of the foldable screen in an expanded state, or the first display area is an entire display area of the foldable screen in an expanded state, and the second display area is another display area of the foldable screen in a folded state.

The method includes: determining the first display area as a display area at which a user gazes; obtaining a resolution of the first display area; when an application cannot adapt to the resolution, modifying a software logical density of an application interface of the application to a first value, where the first value is determined based on the resolution, and the application interface is an interface that is being presented in the second display area; and displaying an adjusted application interface in the first display area.

In this embodiment of this application, when the application cannot adapt to a resolution of the display area, and the application cannot adapt to the resolution of the first display area, the software logical density of the application interface is reconfigured based on the resolution of the first display area, instead of restarting the application, so that a life cycle of the application continues, and user experience can be improved Compared with a conventional technology in which a restart command is sent to an application when the application cannot adapt to a resolution of a display area, this embodiment of this application can ensure continuity of the life cycle of the application, to improve user experience.

For example, the user watches a video in the second display area, and switches a playback interface of the video to the first display area when the video has been played for 1 minute and 30 seconds. If an application that plays the video cannot adapt to the resolution of the first display area, the electronic device may reconfigure a software logical density of the playback interface of the video at 1 minute and 30 seconds based on the resolution of the first display area, instead of restarting the application that plays the video, so that the user can continue to watch the video in the first display area. According to the method provided in this embodiment of this application, video interruption caused by application restart, unexpected exit, or the like can be avoided, thereby improving user experience.

In a possible design, when the application is updated, the software logical density of the application is modified to the first value. According to the foregoing design, the application can adapt to the resolution of the first display area.

In a possible design, before obtaining information about a notch area of the first display area, the method further includes: detecting a power-on signal; detecting that the user switches the application interface from the second display area to the first display area; or detecting that the user switches the application interface from the second display area of the foldable screen to the first display area. According to the foregoing design, in a scenario such as a power-on scenario or a screen switching scenario, a phenomenon such as application restart or unexpected exit can be avoided in the electronic device, to ensure continuity of a life cycle of an application, and further improve user experience.

In a possible design, detecting that a user-oriented display area is switched from the second display area of the foldable screen to the first display area includes: detecting that the foldable screen is switched from the expanded state to the folded state, where the second display area is an entire display area of the foldable screen in the expanded state, and the first display area is a display area of the foldable screen in the folded state; detecting that the foldable screen is switched from the folded state to the expanded state, where the second display area is a display area of the foldable screen in the folded state, and the first display area is an entire display area of the foldable screen in the expanded state; or detecting that a direction of the electronic device changes, so that the user-oriented display area is switched from the second display area to the first display area, where the second display area is a display area of the foldable screen in the folded state, and the first display area is another display area of the foldable screen in the folded state. According to the foregoing design, in a scenario such as a folding scenario, an expanding scenario, or a screen switching scenario, a phenomenon such as application restart or unexpected exit can be avoided in the electronic device, to ensure continuity of a life cycle of an application, and further improve user experience.

In a possible design, detecting that the user switches the application interface from the second display area of the foldable screen to the first display area includes: detecting that the foldable screen is switched from the expanded state to the folded state, where the second display area is an entire display area of the foldable screen in the expanded state, and the first display area is a display area of the foldable screen in the folded state; detecting that the foldable screen is switched from the folded state to the expanded state, where the second display area is a display area of the foldable screen in the folded state, and the first display area is an entire display area of the foldable screen in the expanded state; or detecting that the user makes a specific gesture on the application interface presented in the second display interface. According to the foregoing design, the user may switch the application interface to the first display area by folding the electronic device, expanding the electronic device, making the specific gesture, or the like.

According to a fourth aspect, an embodiment of this application provides a display apparatus. The apparatus includes a foldable screen and a processor. The foldable screen includes a first display area and a second display area. The foldable screen may also be understood as a foldable display screen, for example, a foldable touchscreen. The processor is configured to: obtain a body direction that is of an electronic device and that is opposite to a gravity direction; adjust a display direction of an application interface to the body direction, where the application interface is being presented in the second display area; and presenting the application interface in the first display area.

In a possible design, the processor is further configured to: detect a power-on signal; or detect that a user switches the application interface from the second display area to the first display area.

In a possible design, when detecting that the user switches the application interface from the second display area to the first display area, the processor is specifically configured to: detect that the foldable screen is switched from an expanded state to a folded state, where the second display area is an entire display area of the foldable screen in the expanded state, and the first display area is a display area of the foldable screen in the folded state; or detect that the foldable screen is switched from a folded state to an expanded state, where the second display area is a display area of the foldable screen in the folded state, and the first display area is an entire display area of the foldable screen in the expanded state.

According to a fifth aspect, an embodiment of this application provides a display apparatus. The apparatus includes a foldable screen and a processor. The foldable screen includes a first display area and a second display area. The foldable screen may also be understood as a foldable display screen, for example, a foldable touchscreen. The processor is configured to: obtain information about a notch area of the first display area; adjust a display area of an application interface based on the information about the notch area of the first display area, where the application interface is being presented in the second display area; and present the application interface in the first display area.

In a possible design, the processor is further configured to: detect a power-on signal; or detect that a user switches the application interface from the second display area to the first display area.

In a possible design, when detecting that the user switches the application interface from the second display area to the first display area, the processor is specifically configured to: detect that the foldable screen is switched from an expanded state to a folded state, where the second display area is an entire display area of the foldable screen in the expanded state, and the first display area is a display area of the foldable screen in the folded state; or detect that the foldable screen is switched from a folded state to an expanded state, where the second display area is a display area of the foldable screen in the folded state, and the first display area is an entire display area of the foldable screen in the expanded state.

According to a sixth aspect, an embodiment of this application provides a display apparatus. The apparatus includes a foldable screen and a processor. The foldable screen includes a first display area and a second display area. The foldable screen may also be understood as a foldable display screen, for example, a foldable touchscreen. The processor is configured to: obtain a resolution of the first display area; when an application cannot adapt to the resolution, modify a software logical density of an application interface of the application to a first value, where the first value is determined based on the resolution, and the application interface is being presented in the second display area; and presenting the application interface in the first display area.

In a possible design, the processor is further configured to: when updating the application, modify the software logical density of the application to the first value.

In a possible design, the processor is further configured to: detect a power-on signal; or detect that a user switches the application interface from the second display area to the first display area.

In a possible design, when detecting that the user switches the application interface from the second display area to the first display area, the processor is specifically configured to: detect that the foldable screen is switched from an expanded state to a folded state, where the second display area is an entire display area of the foldable screen in the expanded state, and the first display area is a display area of the foldable screen in the folded state; or detect that the foldable screen is switched from a folded state to an expanded state, where the second display area is a display area of the foldable screen in the folded state, and the first display area is an entire display area of the foldable screen in the expanded state.

According to a seventh aspect, an embodiment of this application provides a chip. The chip includes a processor and a communication interface, and the communication interface is configured to: receive code instructions and transmit the code instructions to the processor. The processor is configured to invoke the code instructions transmitted by the communication interface, to perform an action of the processor in any one of the fourth aspect to the sixth aspect.

According to an eighth aspect, this application further provides a computer-readable storage medium. The computer-readable storage medium includes instructions. When the instructions are run on a computer, the computer is enabled to perform the method in the foregoing aspects.

According to a ninth aspect, this application further provides a computer program product including instructions. When the computer program product is run, the method in the foregoing aspects is performed.

DESCRIPTION OF EMBODIMENTS

Figure 1:
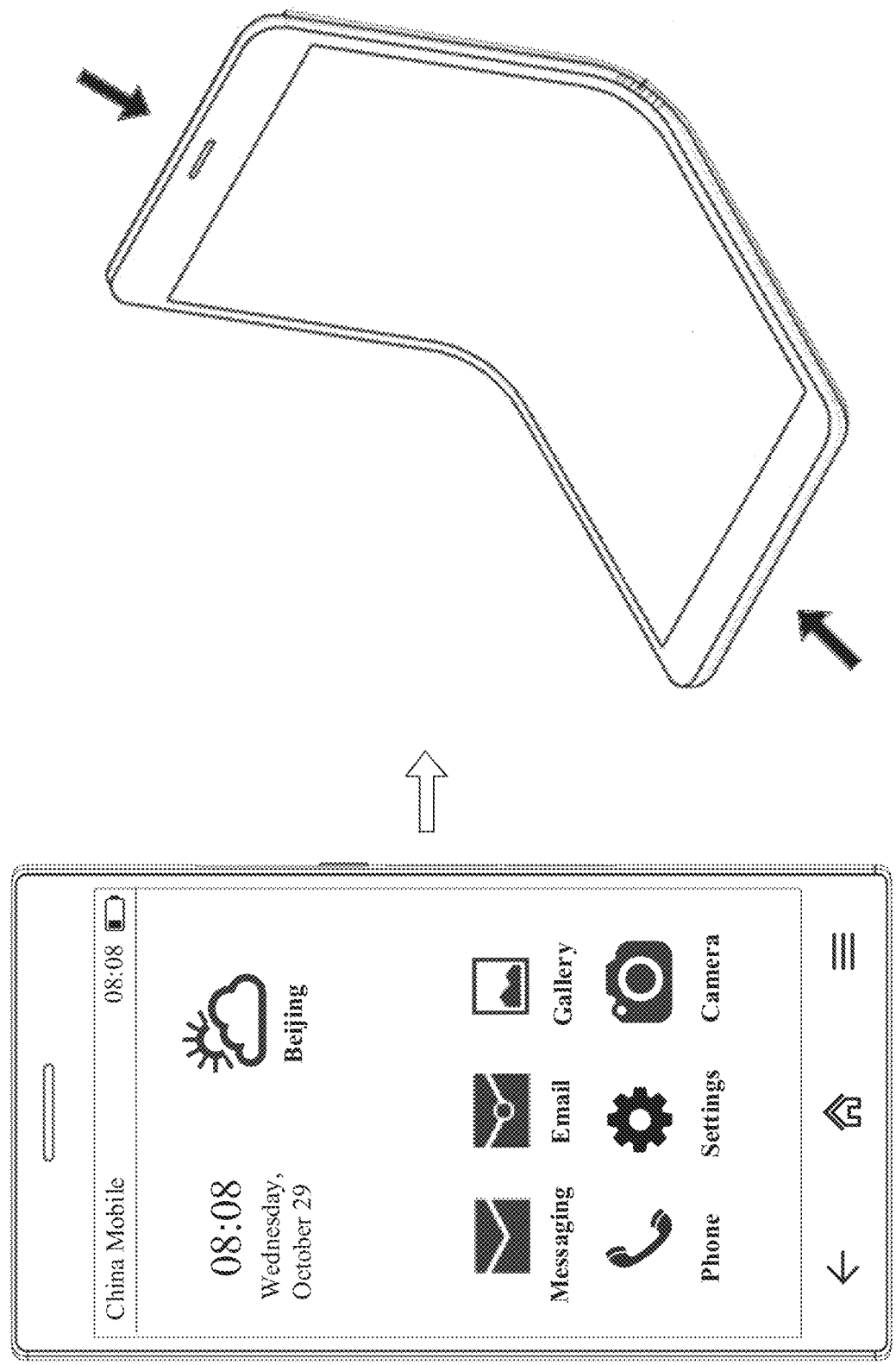
FIG. 1 is a schematic diagram of a foldable mobile phone according to an embodiment of this application.

To make objectives, technical solution, and advantages of embodiments of this application clearer, the following further describes embodiments of this application in detail with reference to the accompanying drawings.

Some terms of embodiments of this application are first described, to help a person skilled in the art have a better understanding.

A device (which is also referred to as a "foldable electronic device", a "foldable screen device", an "electronic device", or the like below for short) with a foldable screen specifically refers to an electronic device with a foldable display screen. The foldable display screen in the electronic device may be an integrally formed flexible display screen, or may be a splicing display screen including a plurality of flexible display screens and a hinge located between every two flexible display screens, a splicing display screen including a plurality of rigid screens and a flexible screen located between every two rigid screens, a splicing display screen including a plurality of rigid screens and a hinge located between every two rigid screens, or the like. This is not limited in embodiments of this application.

Application interface: The foldable electronic device may provide service information through the application interface. It should be understood that the application interface is an interface related to an application (application, app), for example, includes an interface of a system pre-installed application, an interface of a third-party application, an interface of an application icon, an interface displayed after an application is opened, and a notification message interface. The foldable electronic device may implement different functions by installing different applications. The application may be one or more of the following: an instant messaging application, a video application, an audio application, an image shooting application, and the like. The instant messaging application may include, for example, a "Messaging" application, WeChat (WeChat), WhatsApp Messenger, LINE (LINE), Instagram (Instagram), Kakao Talk, and DingTalk. A user may send information such as a text, a voice, a picture, a video file, and various other files to another contact by using the instant messaging application; or a user may implement a voice call, a video call, or the like with another contact by using the instant messaging application. The image shooting application may include, for example, a camera application (a system camera or a third-party camera application). The video application may include, for example, YouTube, Twitter, TikTok, iQIYI, and Tencent Video. The audio application may include, for example, KuGou, EMUMO, and QQ music. The application in embodiments of this application may be an application provided by the electronic device by factory default, or may be an application downloaded and installed by the electronic device from a network side, or an application sent by another electronic device and received by the electronic device. This is not limited in embodiments of this application.

It should be noted that in embodiments of this application, "at least one" means one or more, and "a plurality of" means two or more. In descriptions of embodiments of this application, terms such as "first" and "second" are merely used for distinguishing descriptions, and cannot be understood as indicating or implying relative importance, or as indicating or implying a sequence.

To better understand the technical solutions provided in embodiments of this application, the following first describes an application scenario of embodiments of this application.

Figure 2:
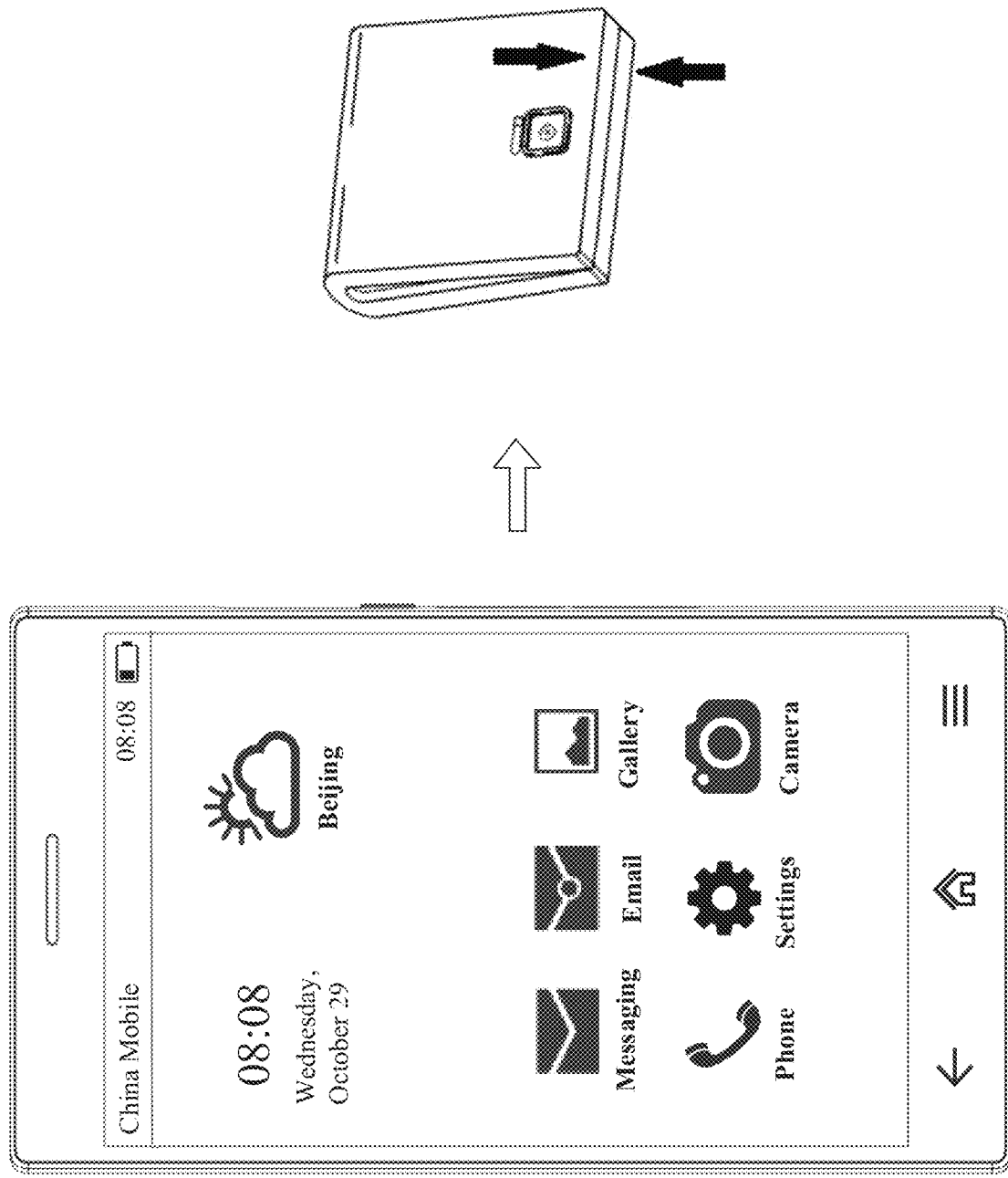
FIG. 2 is a schematic diagram of another foldable mobile phone according to an embodiment of this application.

With continuous development of display screen technologies, emergence of a flexible screen technology brings new breakthroughs to an electronic device. For example, the electronic device is a foldable mobile phone. A display screen of the foldable mobile phone is still in a size of a conventional electronic device after being completely folded, and is easy to carry. However, when the display screen is completely expanded, the foldable mobile phone becomes a tablet computer that can have both entertainment and office functions. This meets a requirement of a user pursuing for portability and diversified functions. The user may view and use, via the display screen of the electronic device, service information provided by the electronic device. Embodiments of this application may be applied to any electronic device with a foldable touch display screen, for example, applied to a foldable mobile phone shown in FIG. 1 and FIG. 2.

Figure 3A:
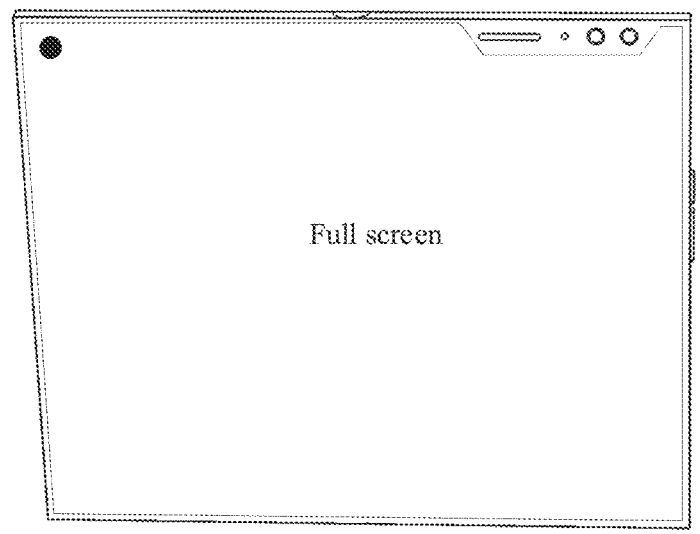
FIG. 3A is a schematic diagram of an electronic device in an expanded state according to an embodiment of this application.
Figure 3B:
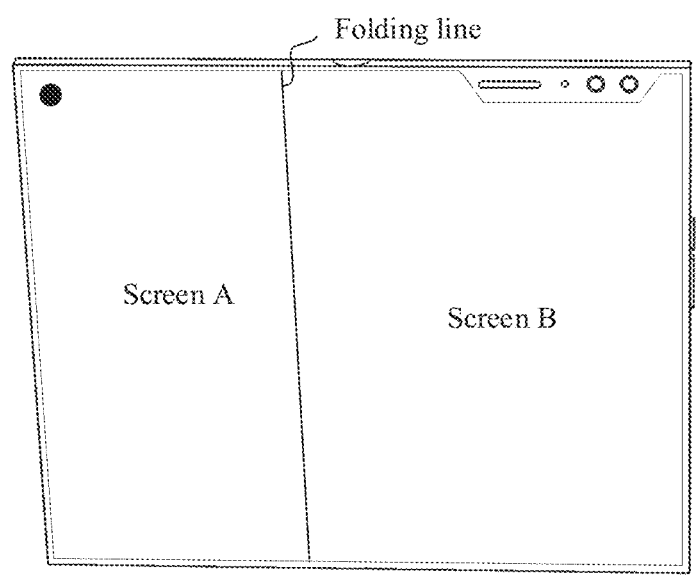
FIG. 3B is a schematic diagram of an electronic device in a folded state according to an embodiment of this application.

The electronic device in an expanded state may be used as a complete display area (which may be referred to as a full screen) for display, as shown in FIG. 3A. The user may fold the screen along a folding line in the foldable screen. After the user folds the screen along the folding line in the foldable screen, the foldable screen may be divided into two display areas along the folding line, as shown in FIG. 3B. The display areas are similar to a display area (which may be referred to as a screen A) of a left screen and a display area (which may be referred to as a screen B) of a right screen that are shown in FIG. 3B.

The electronic device may provide the service information through an application interface. It should be understood that the application interface is an interface related to an application, for example, includes an interface of a system pre-installed application, an interface of a third-party application, an interface of an application icon, an interface displayed after an application is opened, and a notification message interface. The electronic device may implement different functions by installing different applications.

Figure 4:
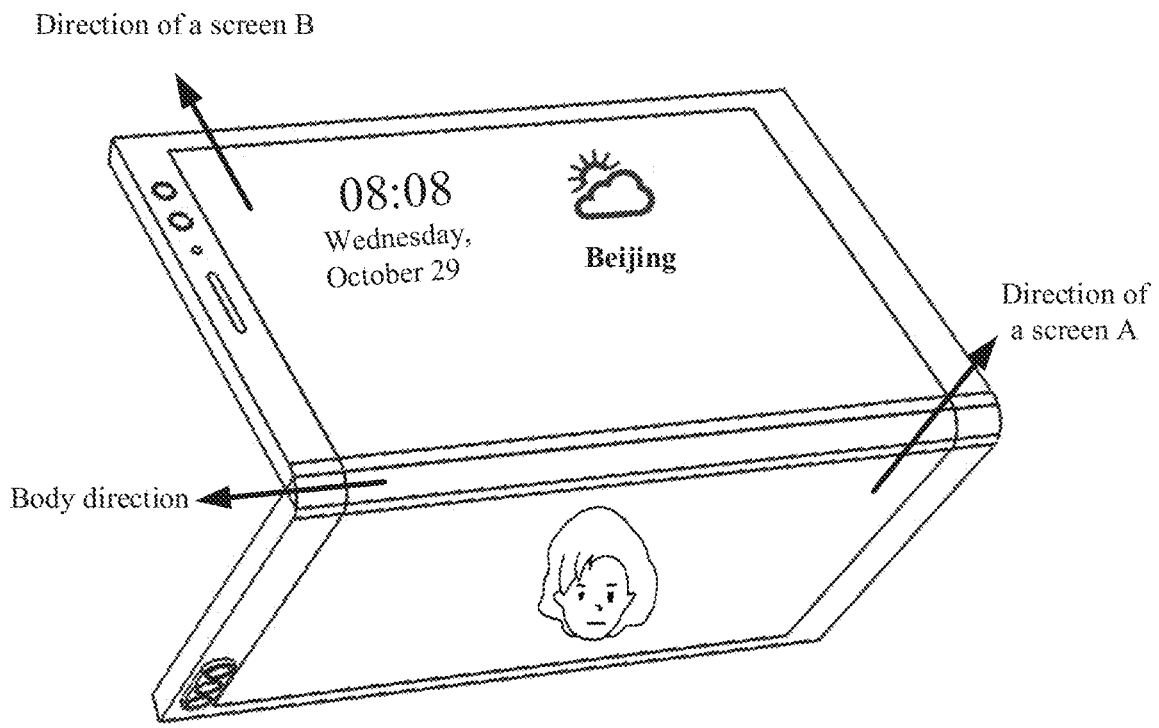
FIG. 4 is a schematic diagram of a display area direction according to an embodiment of this application.
Figure 5:
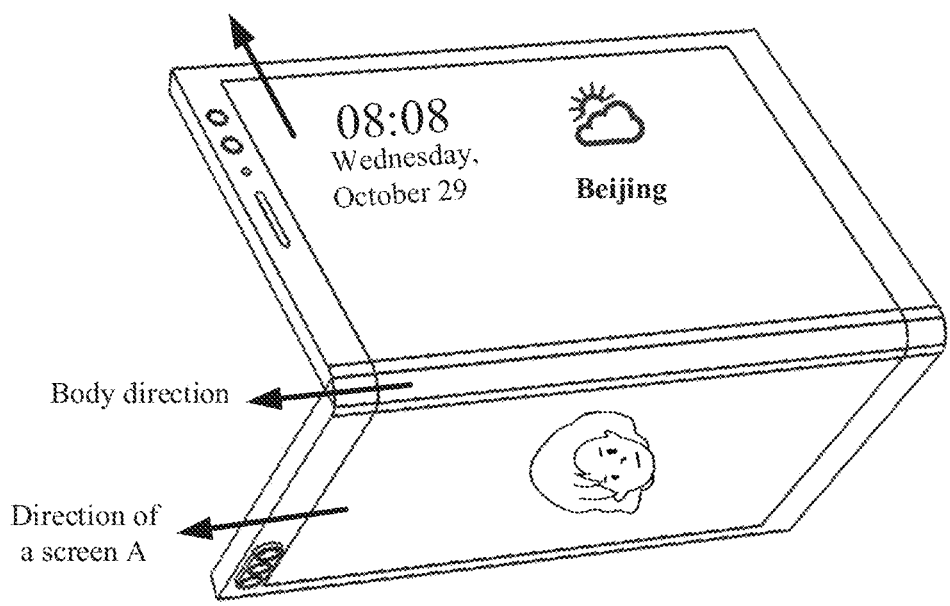
FIG. 5 is a schematic diagram of another display area direction according to an embodiment of this application.
Figure 6:
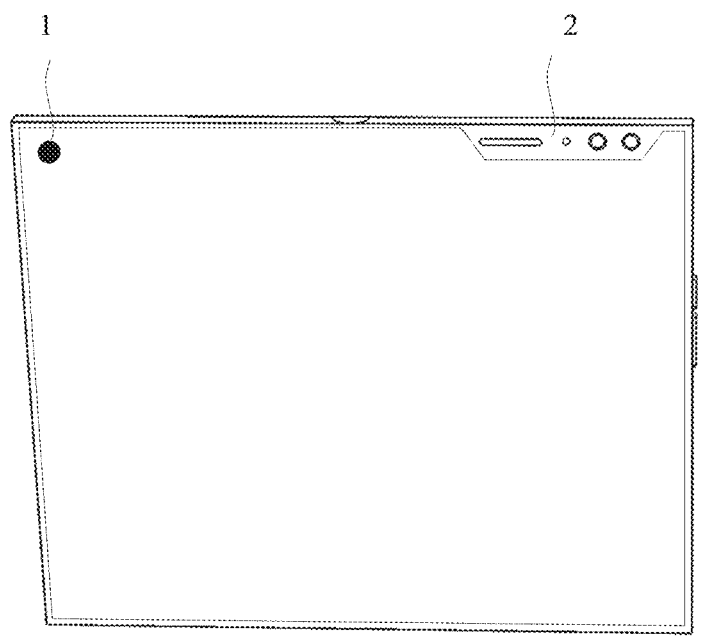
FIG. 6 is a schematic diagram of an electronic device in an expanded state according to an embodiment of this application.
Figure 7:
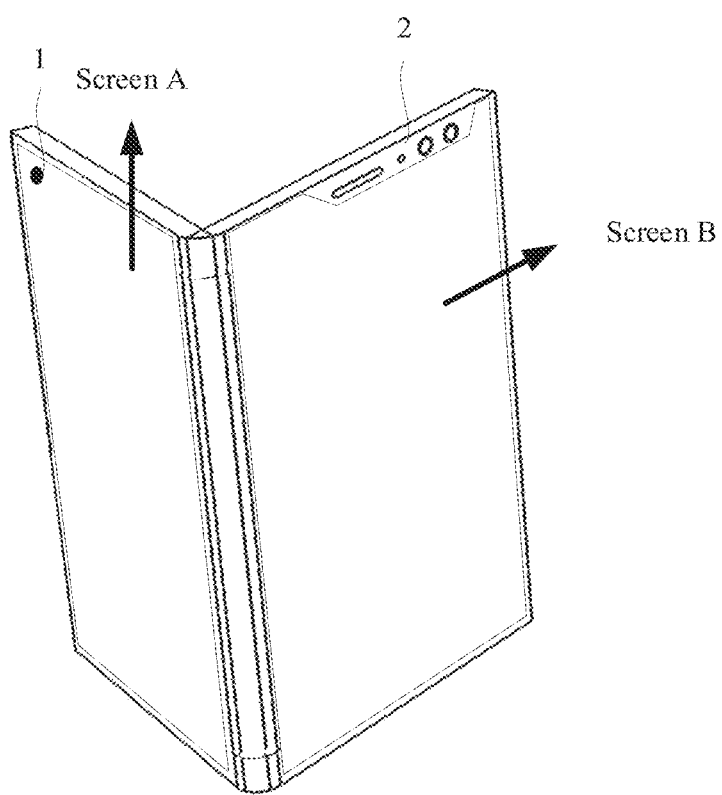
FIG. 7 is a schematic diagram of an electronic device in a folded state according to an embodiment of this application.

Currently, the electronic device with a foldable touch display screen has the following three problems:
  (1) During design of a foldable screen product, a direction set for a display area of a foldable screen in a folded state may be inconsistent with a body direction of the electronic device, for example, as shown in FIG. 4 and FIG. 5. This brings poor experience to the user.
  (2) Some components of the electronic device are located only on one of the screen A and the screen B. FIG. 6 shows an expanded state of an electronic device with a foldable screen. FIG. 7 shows a folded state of an electronic device with a foldable screen. It can be learned from FIG. 6 and FIG. 7 that a camera 1 is disposed at an upper part of the screen A, an earpiece 2 is disposed at an upper part of the screen B, some components such as an infrared sensor and a range sensor are further disposed on the right side of the earpiece 2, and a microphone (not shown in the figure) is disposed at a lower part of the screen B.

Figure 8:
FIG. 8 is a schematic diagram of display pictures of different notch specifications according to an embodiment of this application.

Because notch specifications of the screen A and the screen B are inconsistent when the electronic device is folded, pictures of a same interface displayed in the two display areas are different, for example, as shown in FIG. 8. When the user switches the application interface between the two display areas, a display effect of the application interface is not good because the notch specifications of the two display areas are inconsistent.
  (3) Resolutions of the two display areas are different. When the user switches an application between the two display areas, a phenomenon such as restart, crash, or unexpected exit occurs on the application due to different resolutions.

To resolve the foregoing problem, embodiments of this application provide a display method of a device with a foldable screen. An electronic device obtains a current body direction of the electronic device, so that an application interface is displayed based on the body direction, instead of being displayed based on a direction set for a display area, to improve user experience. The electronic device may further obtain information about a notch area of the current display area, and adjust a display area of an application based on the information about the notch area. Therefore, restart, crash, unexpected exit, or the like of the application that occurs during power-on or screen switching because of different notch specifications can be avoided, and user experience can be improved. When the application cannot adapt to a resolution of a current screen, the electronic device sends a reconfiguration command to a module that controls the application. The reconfiguration command locks a resolution of a display interface of the application to a first value, and the first value is a resolution supported by the application. In the foregoing manner, continuity of a life cycle of the application can be ensured, thereby improving user experience.

The display method provided in embodiments of this application is applicable to any electronic device with a foldable screen. The electronic device in embodiments of this application may also be referred to as a terminal, a terminal device, user equipment (user equipment, UE), or the like. For example, the electronic device in embodiments of this application may be a portable electronic device, for example, a device on which an APP can be installed, such as a mobile phone, a tablet computer, a wearable device (for example, a smartwatch, a smart band, or a smart helmet), a vehicle-mounted device, a smart home, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). An example embodiment of the portable electronic device includes but is not limited to a portable electronic device using HarmonyOS®, IOS®, Android®, Microsoft®, or another operating system. The portable device may alternatively be another portable device provided that the another portable device has a foldable touchscreen and an algorithm operation capability (capable of running a touchscreen display program provided in embodiments of this application). It should further be understood that, in some other embodiments of this application, the electronic device may alternatively not be a portable device, but a desktop computer with a foldable touchscreen and an algorithm operation capability (capable of running a touchscreen display program provided in embodiments of this application).

In embodiments of this application, the foldable screen of the electronic device in an expanded state may be used as a complete display area (which may be referred to as a full screen) for display, and a user may fold the screen along one or more folding lines in the foldable screen. A position of the folding line may be preset, or may be randomly selected by the user on the foldable screen. After the user folds the screen along the folding line in the foldable screen, the foldable screen may be divided into two display areas along the folding line. The display areas are similar to the screen A and the screen B shown in FIG. 3B. It should be noted that the screen A and the screen B may be physically a same screen, or may be two screens. This is not limited in this application. Division of the screen A and the screen B in embodiments of this application is merely for ease of description, and is not intended to limit primary use or secondary use.

Some components of the electronic device are located only on one of the screen A and the screen B. FIG. 6 shows an expanded state of a mobile phone with a foldable screen. FIG. 7 shows a folded state of a mobile phone with a foldable screen. It can be learned from FIG. 6 and FIG. 7 that a camera 1 is disposed at an upper part of the screen A, an earpiece 2 is disposed at an upper part of the screen, some components such as an infrared sensor and a range sensor are further disposed on the right side of the earpiece 2, and a microphone (not shown in the figure) is disposed at a lower part of the screen B. In some implementations, the screen of the electronic device is divided into only the screen A and the screen B. In some other implementations, when the mobile phone is in the folded state, in addition to the screen A and the screen B, the electronic device further includes a side screen. After the user folds the flexible screen along the folding line, the screen A and the screen B may be disposed opposite to each other, or the screen A and the screen B may back toward each other.

Figure 9:
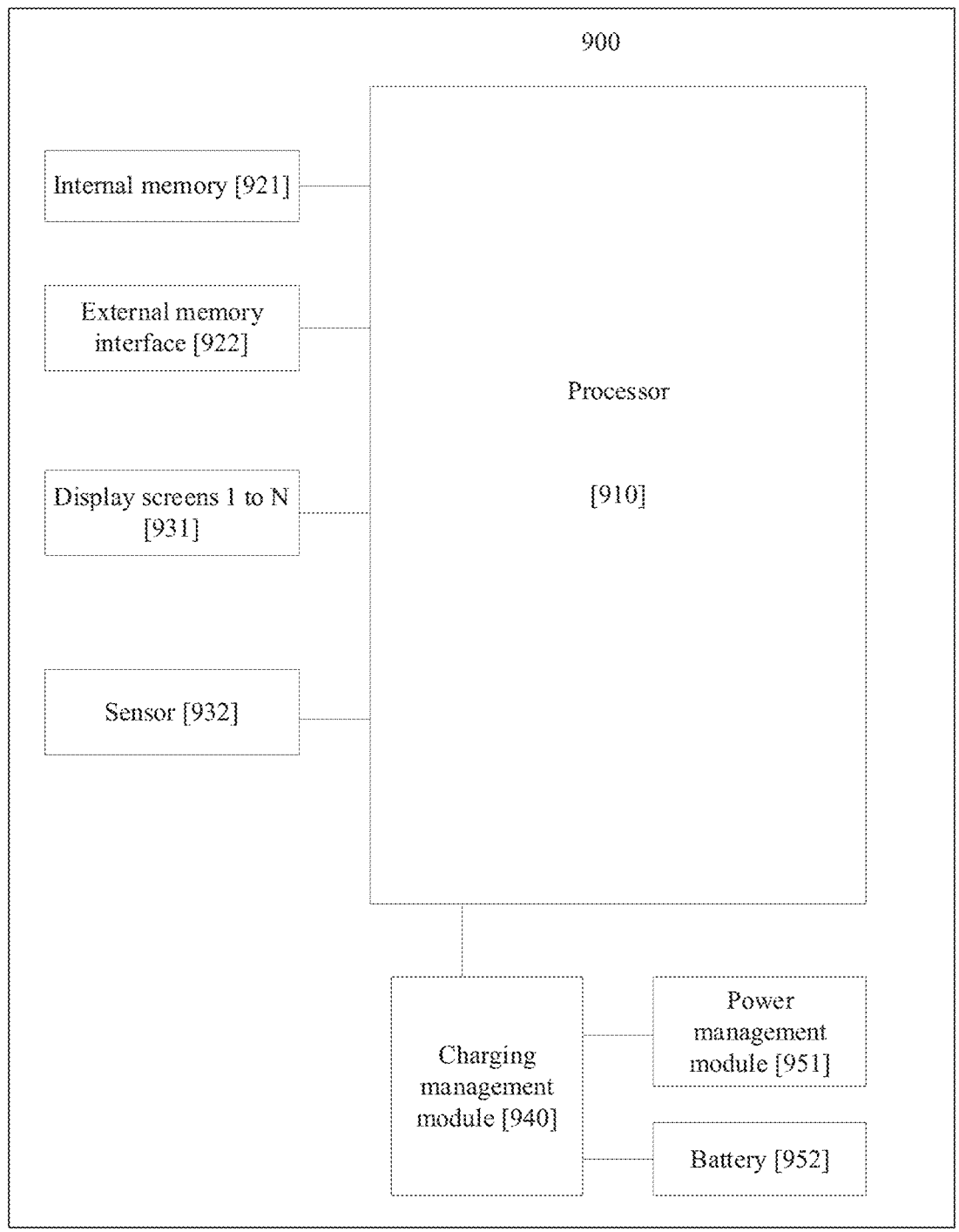
FIG. 9 is a schematic diagram of a structure of an electronic device according to an embodiment of this application.

For example, FIG. 9 is a schematic diagram of a structure of an electronic device to which an embodiment of this application may be applied. Specifically, the electronic device 900 may include a processor 910, an internal memory 921, an external memory interface 922, at least one display screen 931 (herein, a foldable display screen, namely, a foldable screen), a sensor 932, a charging management module 940, a power management module 951, and a battery 952.

Although not shown in FIG. 9, in some other embodiments, the electronic device 900 further includes an antenna 1, an antenna 2, a mobile communication module, and a wireless communication module; may further include a button, for example, a power button and a volume adjustment button light; may further include a camera, for example, a front-facing camera and a rear-facing camera; may further include a motor, configured to generate a vibration prompt (for example, an incoming call vibration prompt); and may further include an indicator, for example, an indicator light, configured to indicate a charging status or a battery level change, or configured to indicate information, a missed call, or a notification. In addition, the electronic device 900 may further include an audio module (a speaker, a telephone receiver, a microphone, and a headset interface), a universal serial bus (universal serial bus, USB) interface, and the like.

The processor 910 may include one or more processing units. For example, the processor 910 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. The electronic device 900 may implement a display function by using the GPU, the display screen 931, the application processor, and the like. The GPU is a microprocessor for image processing, and is connected to the display screen 931 and the application processor. The GPU is configured to: perform mathematical and geometric computation, and render an image. The processor 910 may include one or more GPUs that execute program instructions to generate or change display information.

In this embodiment of this application, the processor 910 may run a display program of a device with a foldable screen according to embodiments of this application, to identify different states of the display screen 931, and display an application interface based on the different states of the display screen 931. The processor 910 may integrate different components. For example, when a CPU and the GPU are integrated, the CPU and the GPU may cooperate to execute instructions of a display method of the device with a foldable screen according to embodiments of this application. For example, in the display method of the device with a foldable screen, some algorithms are executed by the CPU, and the other algorithms are executed by the GPU, to obtain fast processing efficiency.

In some embodiments, a memory may be further disposed in the processor 910, and is configured to store instructions and data. For example, the memory in the processor 910 may be a cache. The memory may store instructions or data that is just used or cyclically used by the processor 910. If the processor 910 needs to use the instructions or the data again, the processor 910 may directly invoke the instructions or the data from the memory. This avoids repeated access, and reduces waiting time of the processor 910, to improve system efficiency.

The internal memory 921 may be configured to store computer-executable program code, where the executable-program code includes instructions. The processor 910 runs the instructions stored in the internal memory 921, to perform various function applications and data processing of the electronic device 900. The internal memory 921 may include a program storage area and a data storage area. The program storage area may store an operating system, an application required by at least one function (for example, a sound playback function and an image/text display function), and the like. The data storage area may store data (such as audio data and a phone book) created during use of the electronic device 900, and the like. In addition, the internal memory 921 may include a high-speed random access memory, and may further include a nonvolatile memory, for example, at least one magnetic disk storage device, a flash storage device, or a universal flash storage (universal flash storage, UFS).

In this embodiment of this application, the internal memory 921 may store instructions used to identify the state of the display screen 931 and instructions for displaying the application interface based on the state of the display screen 931. The processor 910 may invoke the instructions stored in the internal memory 921, to perform a display process of the device with a foldable screen.

The external memory interface 922 may be used to connect to an external memory card (for example, a micro SD card), to extend a storage capability of the electronic device 900. The external storage card communicates with the processor 910 through the external memory interface 922, to implement a data storage function. For example, a file such as a picture or a video is stored in the external storage card.

The display screen 931 may be configured to display an image, a video, and the like. The display screen 931 may include a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 900 may include one or N display screens 931, where N is a positive integer greater than 1.

Figure 10:
FIG. 10 is a schematic diagram of an integrally formed flexible display screen according to an embodiment of this application.
Figure 11:
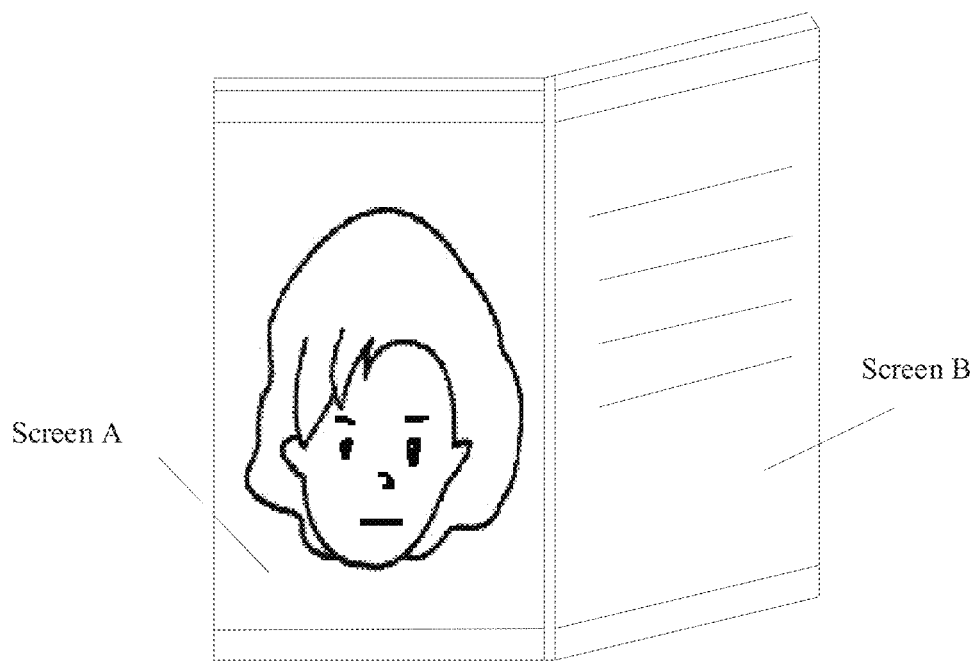
FIG. 11 is a schematic diagram of a splicing display screen according to an embodiment of this application.

In this embodiment of this application, the display screen 931 may be an integrally formed flexible display screen (which is specifically shown in FIG. 10), or may be a splicing display screen (which is specifically shown in FIG. 11) including a plurality of rigid screens and a flexible screen located between every two rigid screens. In a process of folding the display screen 931, a complete screen before the folding displays the application interface, and each screen formed after the folding may display the application interface. Therefore, it may be understood as that the display screen 931 forms a visual "independent screen" after the folding, for example, a screen A and a screen B shown in FIG. 11, namely, two "independent screens" formed after the display screen is folded.

In this embodiment of this application, the display screen 931 is also referred to as a foldable touchscreen, a foldable screen, a foldable display screen, or the like.

The sensor 932 may include an acceleration sensor, and may further include one or more of an acceleration sensor, a pressure sensor, a gyroscope sensor, a barometric pressure sensor, a magnetic sensor, an infrared sensor, a range sensor, an optical proximity sensor, a fingerprint sensor, a temperature sensor, a touch sensor, an ambient light sensor, a bone conduction sensor, and the like. In some embodiments, the touch sensor may be disposed in each of the one or N display screens 931. The touch sensor detects a touch operation of a user on the display screen 931, and reports information about a touch position of the user on the display screen 931 to the processor 910. The processor 910 determines, based on the information about the touch position reported by the touch sensor, that the instructions or the operation is received.

In the process of folding the display screen 931, the sensor 932 in the electronic device 900 may collect a motion trend or an angle of the display screen 931 in real time. For example, the acceleration sensor collects current spatial representation information of the display screen 931, where the spatial representation information may be acceleration information (which is also referred to as "acceleration data") on three axes. The processor 910 may determine, based on the current spatial representation information of the display screen 931, spatial information and included angle information (including a degree of an included angle) between every two screens obtained after the display screen 931 is folded. When the display screen 931 is folded, an axis between every two screens may be represented as a common axis of the two screens. It may alternatively be understood as that the display screen 931 is folded along a common axis when being folded. The spatial information may be used to represent a folding posture of the display screen 931. The folding posture includes opposite folding (or referred to as an inward folding posture) and back folding (or referred to as an outward folding posture), a horizontal folding posture and a vertical folding posture, and the like. The degree of the included angle may be a degree of an included angle between the folded screens, or a degree of an included angle between folded housings.

The memory of the electronic device 900 may store program instructions for identifying the state of the display screen based on the included angle between the screens. The memory may be an internal memory 921, an external memory card connected through the external memory interface 922, or the like.

The processor 910 may determine a current target folded state of the display screen 931 of the electronic device 900 based on the determined included angle between every two screens of the display screen 931 and the program instructions that are stored in the memory and that are used to identify the state of the display screen.

The memory of the electronic device 900 may further store program instructions for displaying the application interface based on the state of the display screen. The processor 910 may determine, based on the determined current state of the display screen 931 and the program instructions that are stored in the memory and that are for displaying the application interface based on the state of the display screen, a display policy corresponding to the electronic device 900 in the current state, and then display the application interface on the folded display screen 931 according to the corresponding display policy.

The charging management module 940 is configured to receive a charging input from a charger. The charger may be a wireless charger or a wired charger. In some embodiments of wired charging, the charging management module 940 may receive a charging input from the wired charger through the USB interface. In some embodiments of wireless charging, the charging management module 940 may receive a wireless charging input by using a wireless charging coil of the electronic device 900. When charging the battery 952, the charging management module 940 may further supply power to the electronic device 900 by using the power management module 951.

The power management module 951 is configured to connect to the battery 952, the charging management module 940, and the processor 910. The power management module 951 receives an input of the battery 952 and/or the charging management module 940, and supplies power to the processor 910, the internal memory 921, the external memory 922, the display screen 931, and the like. The power management module 951 may be further configured to monitor parameters such as a battery capacity, a quantity of battery cycles, and a battery health status (electric leakage and impedance). In some other embodiments, the power management module 951 may alternatively be disposed in the processor 910. In some other embodiments, the power management module 951 and the charging management module 940 may alternatively be disposed in a same component.

It should be understood that a hardware structure of the electronic device 900 shown in FIG. 9 is merely an example. The electronic device 900 in this embodiment of this application may have more or fewer components than those shown in the figure, may combine two or more components, or may have different component configurations. Components shown in the figure may be implemented in hardware including one or more signal processing and/or application-specific integrated circuits, software, or a combination of hardware and software.

Figure 12:
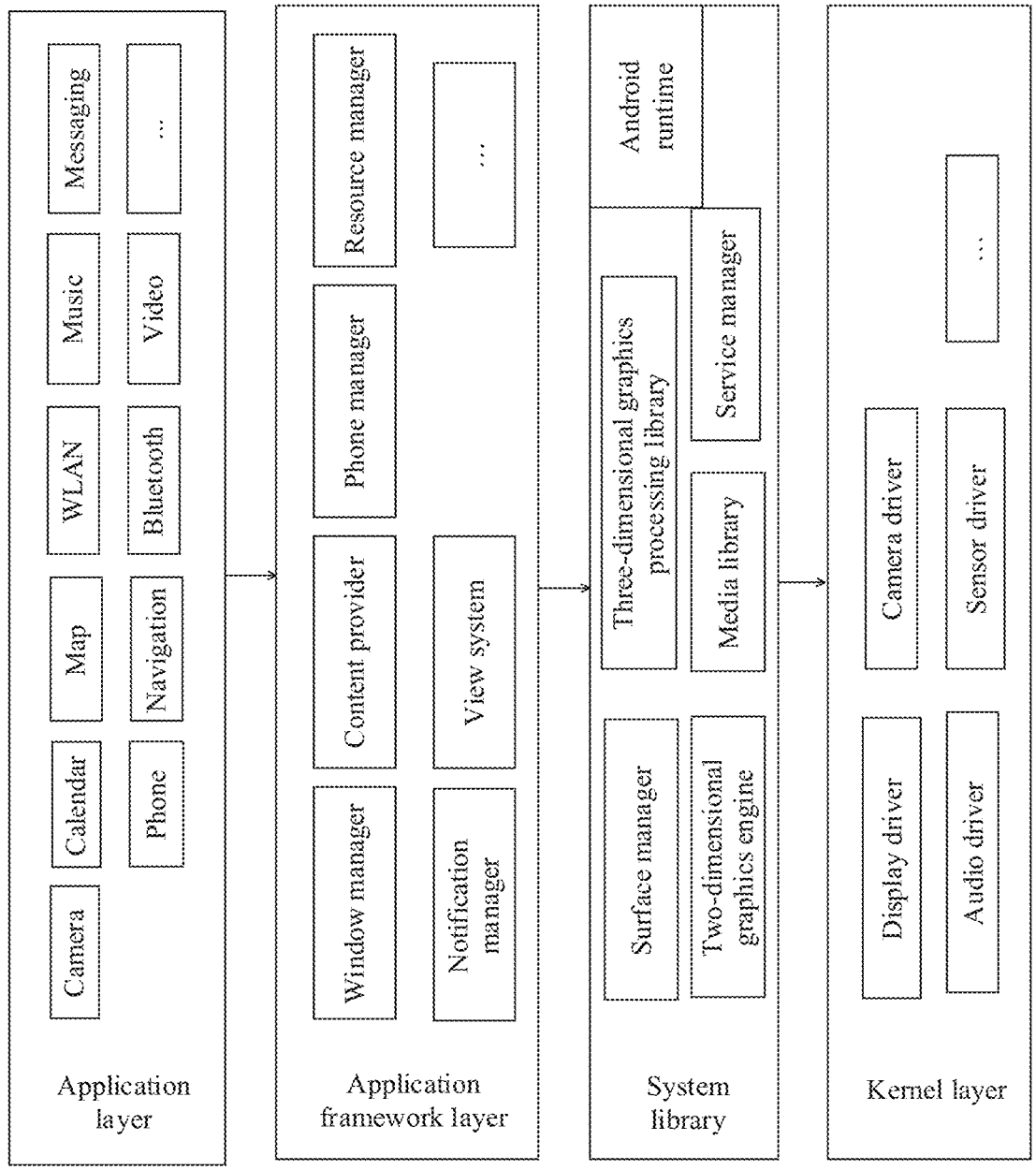
FIG. 12 is a block diagram of a software structure of an electronic device according to an embodiment of this application.

FIG. 12 is a block diagram of a software structure of an electronic device according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 12, the application packages may include applications such as Camera, Gallery, Calendar, Phone, Map, Navigation, WLAN, Bluetooth, Music, Video, Messaging, and Beauty camera.

The application framework layer provides an application programming interface (application programming interface, API) and a programming framework for an application at the application layer. The application framework layer includes some predefined functions, for example, an information display information (DisplayInfo) module, a logical display (LogicalDisplay) function, a device display function of a logical display object (LogicalDisplayAdapter.LogicaDisplayDevice function), a device display (DisplayDevice) function, an activity record (ActivityRecord) function, and a resource update (ResourcesImpl) function. The DisplayInfo module encapsulates screen-related information of the electronic device, and the screen information (including an absolute height, an absolute width, a logical density, a resolution, a notch area, a display direction, and the like) may be obtained by invoking the DisplayInfo module. The LogicalDisplay function may be used to set a display parameter. The LogicalDisplayAdapter.LogicalDisplayDevice function may be used to lock a display parameter on an application interface as the set display parameter. The DisplayDevice function may be used to display the application interface. The ActivityRecord function may be used to control an application, and the ResourcesImpl function may be used to update a display configuration of the application.

As shown in FIG. 12, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to: store and obtain data, and enable the data to be accessed by the application. The data may include a video, an image, an audio, calls that are made and answered, a browsing history and bookmarks, an address book, and the like.

The view system includes visual controls such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function of the electronic device, for example, management of call statuses (including answering, declining, and the like).

The resource manager provides various resources such as a localized character string, an icon, a picture, a layout file, and a video file for the application.

The notification manager enables the application to display notification information in the status bar, and may be configured to convey a notification message. The notification manager may automatically disappear after a short pause without requiring a user. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes in detail, with reference to the hardware structure of the electronic device 900 shown in FIG. 9, a display method of an electronic device with a foldable screen according to embodiments of this application.

The method provided in embodiments of this application may be applied to a power-on scenario, or may be applied to a screen switching scenario or the like. For example, after a user folds the foldable screen of the electronic device, the electronic device switches an application interface displayed in a display area (namely, a full screen) in an expanded state to a display area (a screen A or a screen B) obtained after the folding. For another example, a user switches an application interface of an application from a display area of the electronic device in a folded state to another display area. In example descriptions, the user switches an application interface of WeChat from a screen A of the electronic device to a screen B. For still another example, after a user expands the electronic device in a folded state, the electronic device switches an application interface presented in a display area (a screen A or a screen B) of the electronic device in the folded state to an expanded display area (namely, a full screen).

Figure 13A:
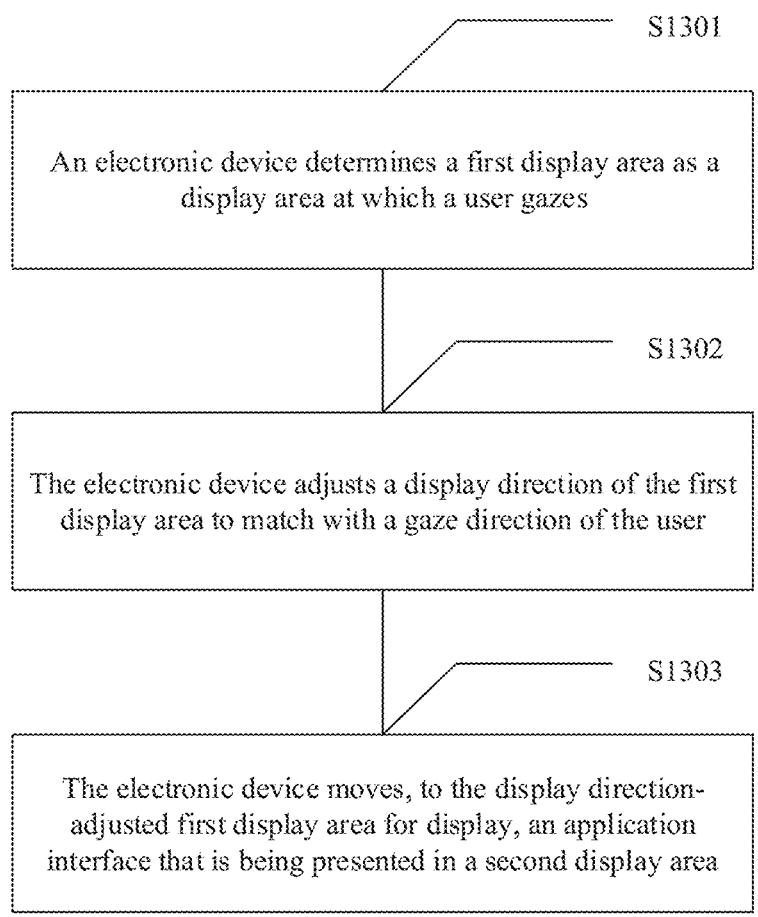
FIG. 13A is a schematic flowchart of a display method according to an embodiment of this application.

For the foregoing problem (1), an embodiment of this application provides a display method. As shown in FIG. 13A, the method includes the following steps.

S1301: An electronic device determines a first display area as a display area at which a user gazes.

In some possible implementations, before step S1301, the electronic device may detect a power-on signal, and start a system. After the electronic device is powered on, a user-oriented display area of the electronic device is the first display area. For example, after the electronic device in an expanded state is powered on, the first display area is an entire display area, for example, the full screen shown in FIG. 3A. For another example, after the electronic device in a folded state is powered on, the first display area is a display area, for example, the screen A or the screen B shown in FIG. 3B, of a foldable screen in the folded state.

Figure 13B:
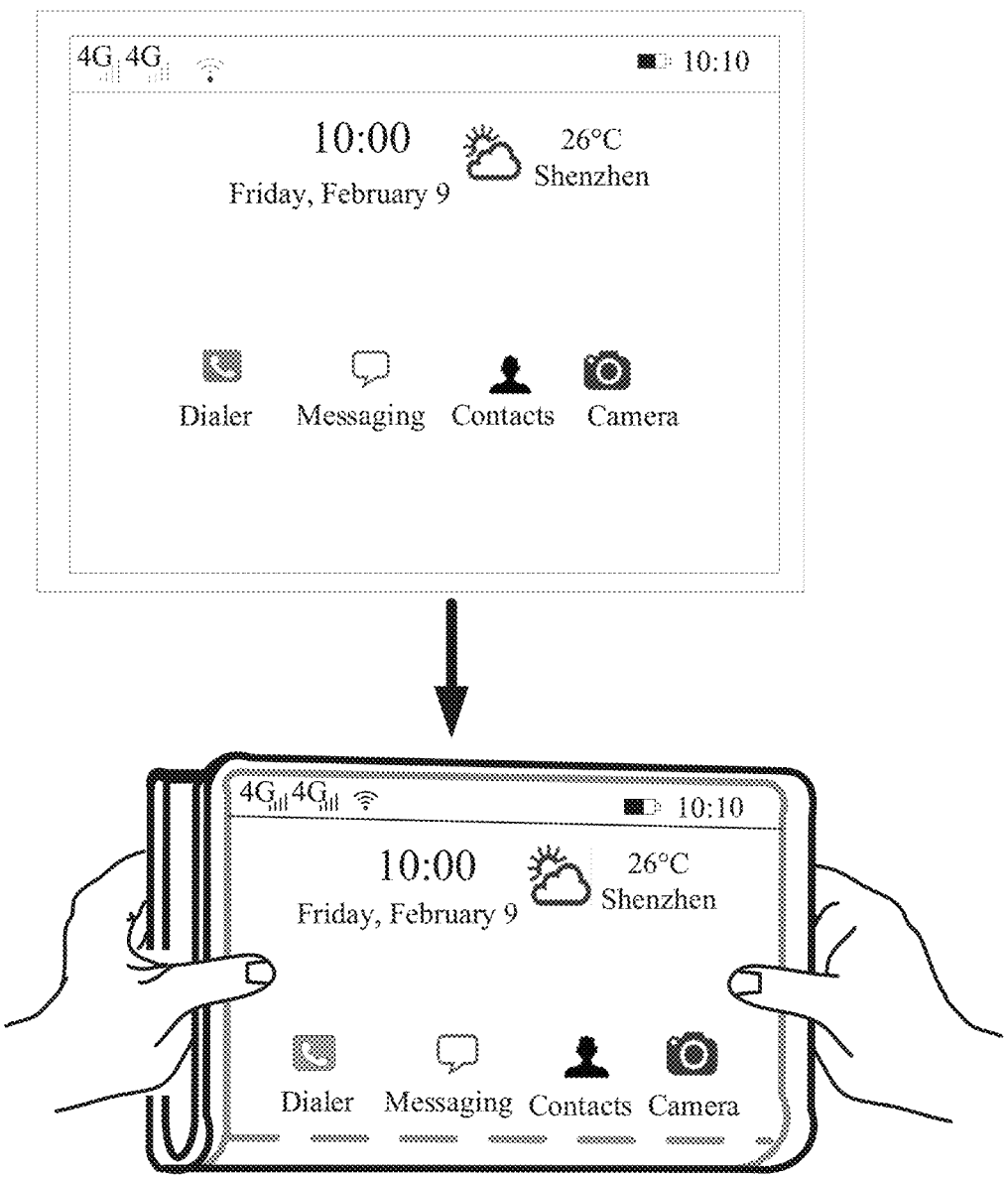
FIG. 13B is a schematic diagram of screen switching according to an embodiment of this application.
Figure 13C:
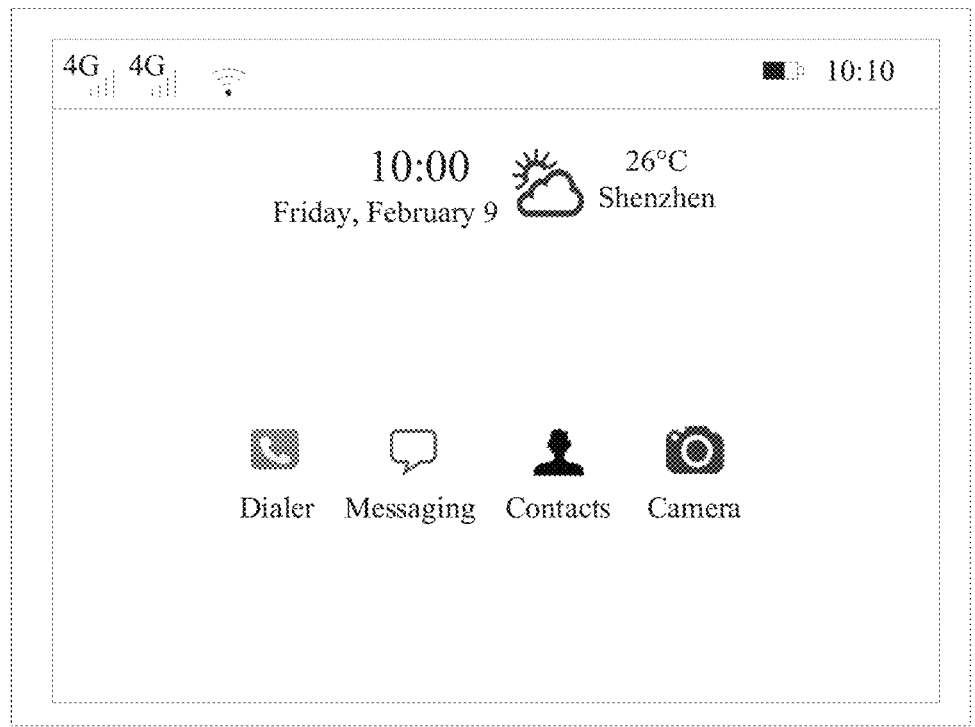
FIG. 13C is another schematic diagram of screen switching according to an embodiment of this application.
Figure 13C:
Figure 13C:
Figure 13D:
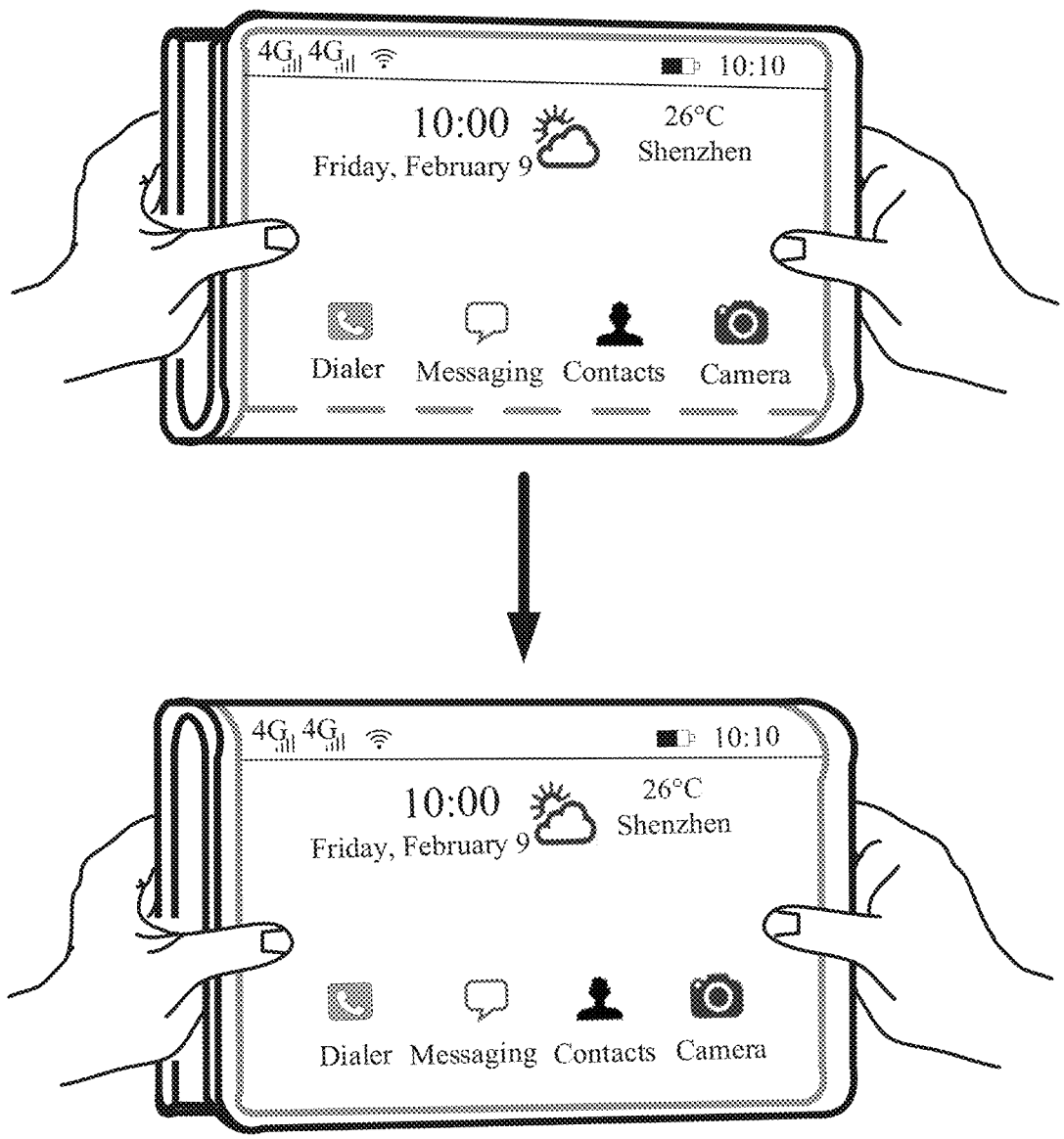
FIG. 13D is another schematic diagram of screen switching according to an embodiment of this application.
Figure 13E:
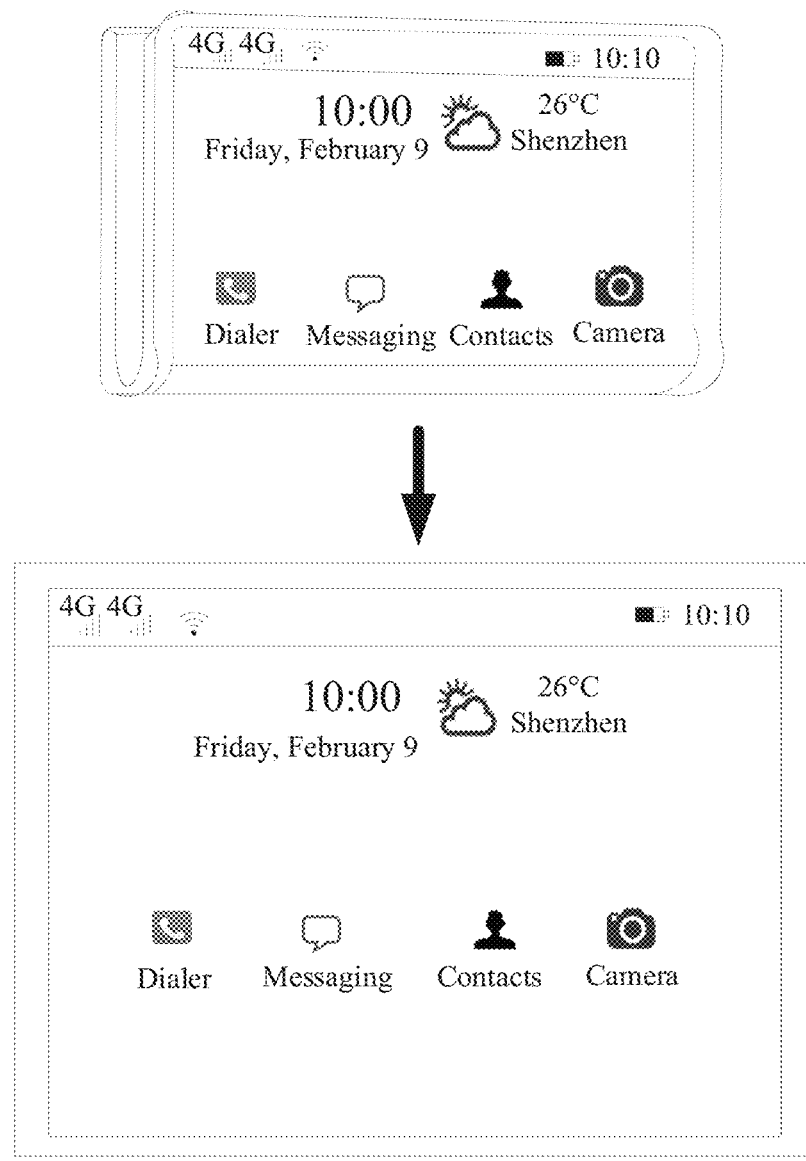
FIG. 13E is another schematic diagram of screen switching according to an embodiment of this application.

In some other possible implementations, before step S1501, the electronic device may detect that the user switches a display area of a mobile phone with a foldable screen from a second display area to the first display area. For example, as shown in FIG. 13B or FIG. 13C, the electronic device detects that the user folds a display screen, and switches the display area of the mobile phone with a foldable screen from an entire display area (which is equivalent to the second display area) in an expanded state to a display area (which is equivalent to the first display area) in a folded state. For another example, as shown in FIG. 13D, the electronic device detects that the user changes a handheld direction of the mobile phone with a foldable screen, and switches the display area of the mobile phone with a foldable screen from a display area (which is equivalent to the second display area) in a folded state to another display area (which is equivalent to the first display area). For still another example, as shown in FIG. 13E, the electronic device detects that the user expands a display screen, and switches the display area of the mobile phone with a foldable screen from a display area (which is equivalent to the second display area) in a folded state to an entire display area (which is equivalent to the first display area) in an expanded state.

S1302: The electronic device adjusts a display direction of the first display area to match with a gaze direction of the user.

S1303: The electronic device moves, to the display direction-adjusted first display area for display, an application interface that is being presented in the second display area.

For example, the first display area may be an entire display area in the expanded state, for example, the full screen shown in FIG. 3A, or may be a display area in the folded state, for example, the screen A or the screen B shown in FIG. 3B.

Figure 14:
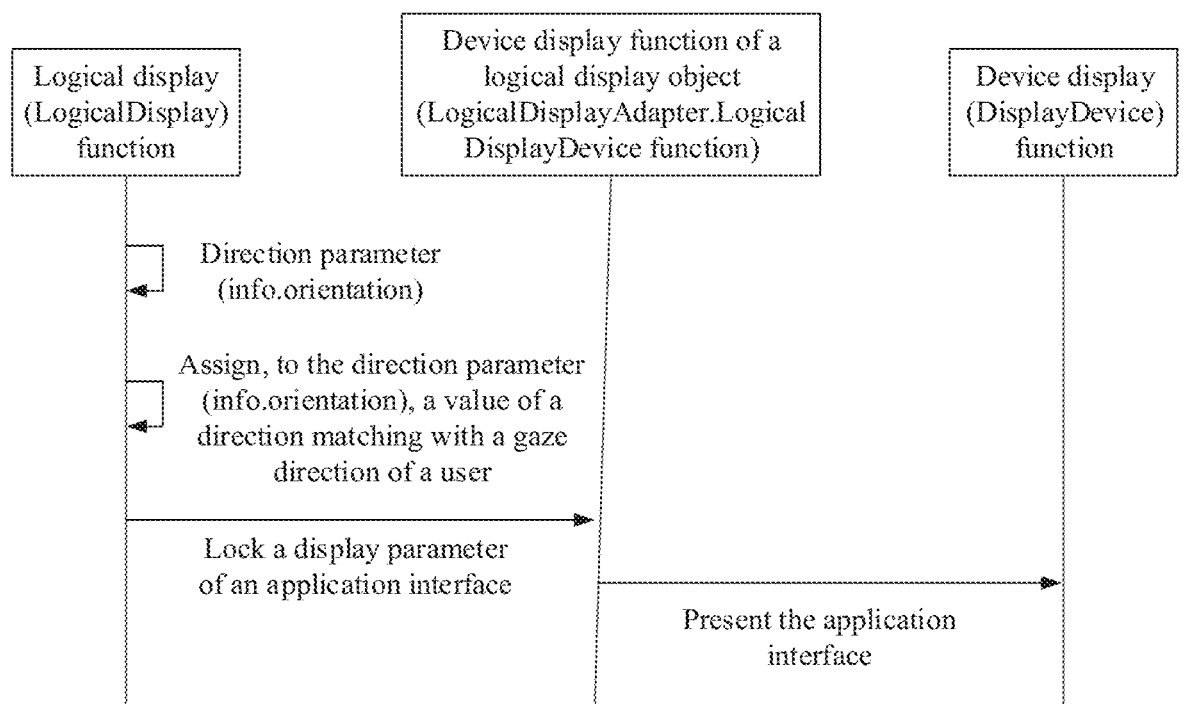
FIG. 14 is a schematic diagram of function call according to an embodiment of this application.

In an implementation, as shown in FIG. 14, the electronic device may obtain a direction parameter info.orientation of a current display area by calling a LogicalDisplay function. The electronic device may assign, to info.orientation by calling the LogicalDisplay function, a value of a direction matching with the gaze direction of the user. The electronic device may lock a display parameter of the application interface as reconfigured info.orientation by calling a LogicalDisplayAdapter. LogicalDisplayDevice function. The electronic device may present the application interface by calling a DisplayDevice function, where a display direction of the application interface matches with the gaze direction of the user.

The scenario shown in FIG. 5 is used as an example. It is assumed that the direction matching with the gaze direction of the user is a first direction, and a direction of the screen B is a second direction. When the user switches an application interface on the screen A to the screen B, the electronic device may obtain, by using a sensor 932, that a body direction is the first direction. The electronic device may obtain a direction parameter info.orientation of the screen B by invoking a DisplayInfo module. In this case, a value of info.orientation is a parameter value corresponding to the second direction. The electronic device may assign, to info orientation by calling the LogicalDisplay function, a parameter value corresponding to the first direction. The electronic device may lock, by calling the LogicalDisplayAdapter.LogicalDisplayDevice function, a display parameter of the application interface as info.orientation obtained after the re-assignment. The electronic device may present the application interface by calling the DisplayDevice function, where a display direction of the application interface is the first direction.

In this embodiment of this application, in a scenario such as a power-on scenario or a screen switching scenario, the electronic device adjusts a display direction of a user-oriented display area based on the gaze direction of the user, so that an application interface to be presented in the first display area matches with the gaze direction of the user, and the application interface is not displayed in the display area in a display direction that is set by factory default. According to this embodiment of this application, even if the display area direction that is set by factory default is inconsistent with the body direction, display may be performed in a direction matching with the gaze direction of the user without restarting an application, so that a life cycle of the application continues, and user experience can be improved.

For example, the user watches a video in the second display area, and switches a playback interface of the video to the first display area when the video has been played for 1 minute and 30 seconds. The electronic device adjusts the display direction of the first display area to the direction matching with the gaze direction of the user, and presents the play back interface of the video at 1 minute and 30 seconds, so that a presentation direction of the playback interface matches with the gaze direction of the user, and the user can continue to watch the video in the first display area. According to the method provided in this embodiment of this application, video interruption caused by application restart, unexpected exit, or the like can be avoided, thereby improving user experience.

Figure 15:
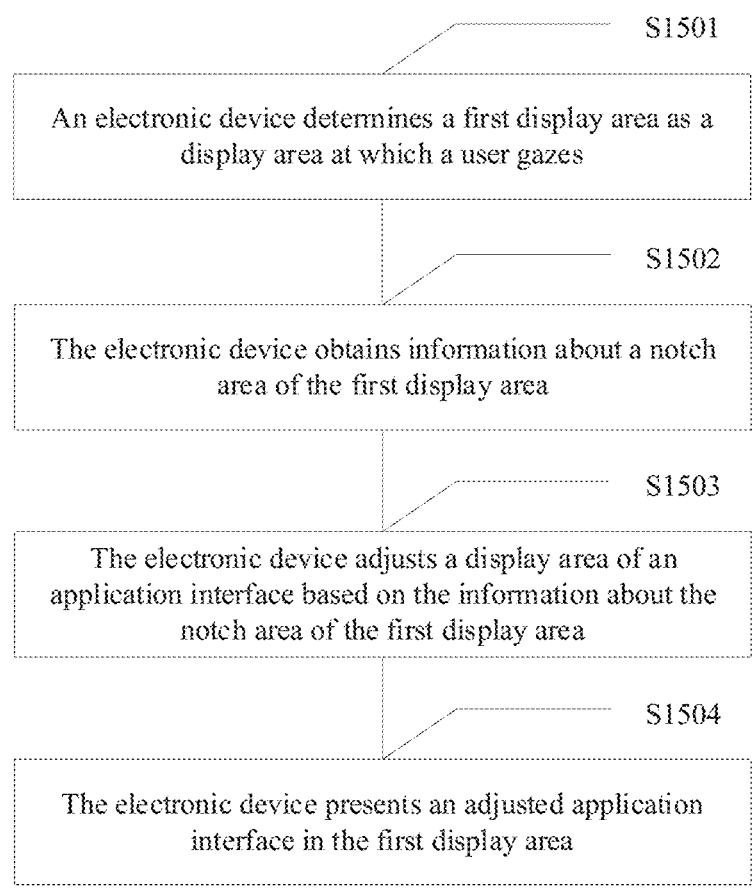
FIG. 15 is a schematic flowchart of a display method according to an embodiment of this application.

For the foregoing problem (2), an embodiment of this application provides a display method. As shown in FIG. 15, the method includes the following steps.

S1501: An electronic device determines a first display area as a display area at which a user gazes.

S1502: The electronic device obtains information about a notch area of the first display area.

For example, the first display area may be an entire display area, for example, the full screen shown in FIG. 3A, of a mobile phone with a foldable screen in an expanded state, or may be a display area, for example, the screen A or the screen B shown in FIG. 3B, of the mobile phone with a foldable screen in a folded state.

In an implementation, the electronic device may obtain the information about the notch area of the first display area by invoking a DisplayInfo module.

In some possible implementations, before step S1501, the electronic device may detect a power-on signal, and start a system. After being powered on, the electronic device may determine a user-oriented display area as the first display area. For example, after the mobile phone with a foldable screen in the expanded state is powered on, the first display area is an entire display area, for example, the full screen shown in FIG. 3A. For another example, after the mobile phone with a foldable screen in the folded state is powered on, the first display area is a display area, for example, the screen A or the screen B shown in FIG. 3B, of the foldable screen in the folded state.

In some other possible implementations, before step S1501, the electronic device may detect that the user switches a display area of the mobile phone with a foldable screen from a second display area to the first display area. For example, as shown in FIG. 13B or FIG. 13C, the electronic device detects that the user folds a display screen, and switches the display area of the mobile phone with a foldable screen from an entire display area (which is equivalent to the second display area) in the expanded state to a display area (which is equivalent to the first display area) in the folded state. For another example, as shown in FIG. 13D, the electronic device detects that the user changes a handheld direction of the mobile phone with a foldable screen, and switches the display area of the mobile phone with a foldable screen from a display area (which is equivalent to the second display area) in the folded state to another display area (which is equivalent to the first display area). For still another example, as shown in FIG. 13E, the electronic device detects that the user expands a display screen, and switches the display area of the mobile phone with a foldable screen from a display area (which is equivalent to the second display area) in the folded state to an entire display area (which is equivalent to the first display area) in the expanded state.

S1503: The electronic device adjusts a display area of an application interface based on the information about the notch area of the first display area, where the application interface is an interface that is being presented in the second display area.

Figure 16:
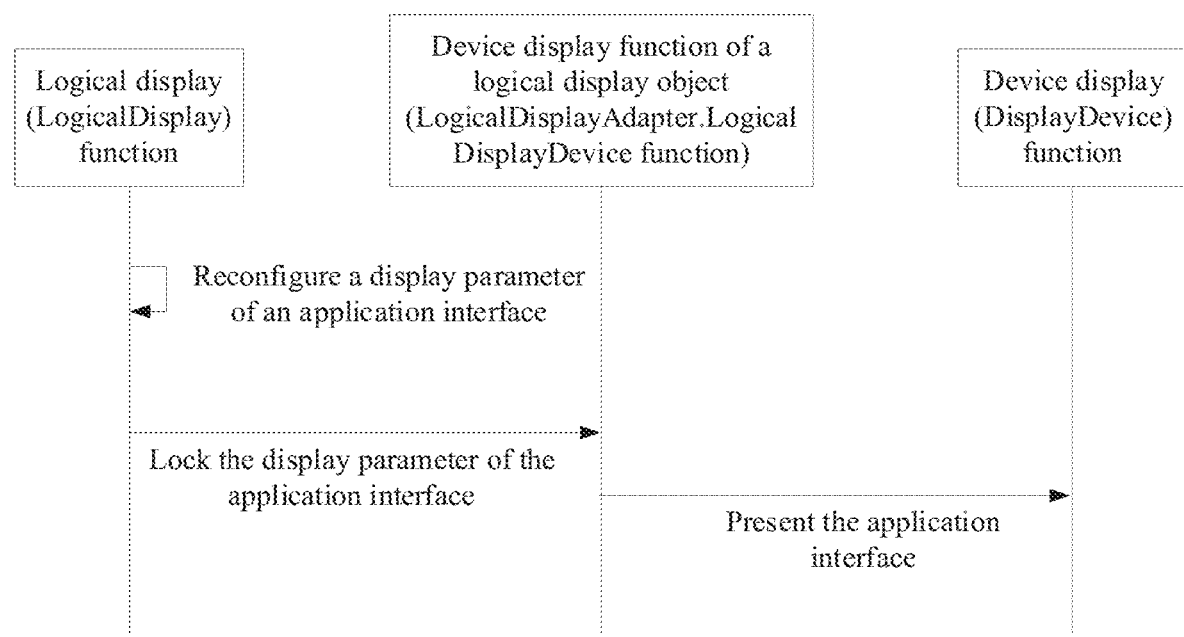
FIG. 16 is a schematic diagram of function call according to an embodiment of this application.

In an implementation, as shown in FIG. 16, the electronic device may reconfigure a display parameter of the application interface by calling a LogicalDisplay function, where a reconfigured display parameter of the application interface is determined based on the information about the notch area of the first display area. The electronic device may lock the display parameter of the application interface as the reconfigured display parameter by calling a LogicalDisplayAdapter.LogicalDisplayDevice function. The electronic device may present the application interface by calling the DisplayDevice function, where the display area of the application interface may adapt to the first display area.

S1504: The electronic device presents an adjusted application interface in the first display area.

Figure 17:
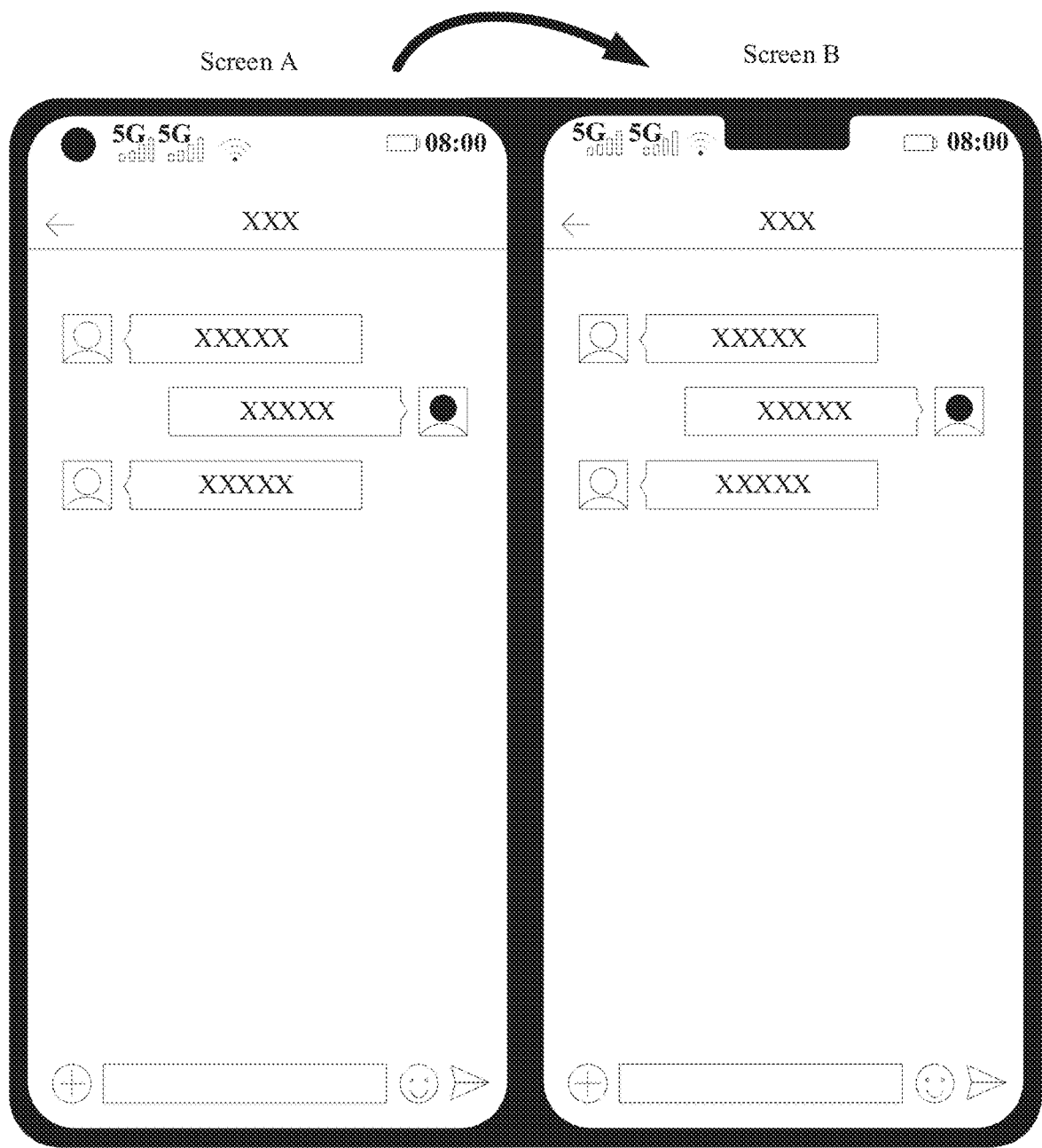
FIG. 17 is a schematic diagram of a display picture after screen switching according to an embodiment of this application.

As shown in FIG. 17, when the user switches an application interface from being displayed on a screen A to being displayed on a screen B, a display area of the application interface is adjusted based on a notch area of the screen B.

In this embodiment of this application, in a scenario such as a power-on scenario or a screen switching scenario, the electronic device adjusts the display area of the application interface based on the notch area of the first display area, so that application restart, unexpected exit, or the like can be avoided, a life cycle of the application continues, and user experience can be improved.

For example, the user watches a video in the second display area, and switches a playback interface of the video to the first display area for display when the video has been played for 1 minute and 30 seconds. The electronic device adjusts a display area of the play back interface of the video at 1 minute and 30 seconds based on the notch area of the first display area, so that the user can continue to watch the video in the first display area. According to the method provided in this embodiment of this application, video interruption caused by application restart, unexpected exit, or the like can be avoided, thereby improving user experience.

Figure 18:
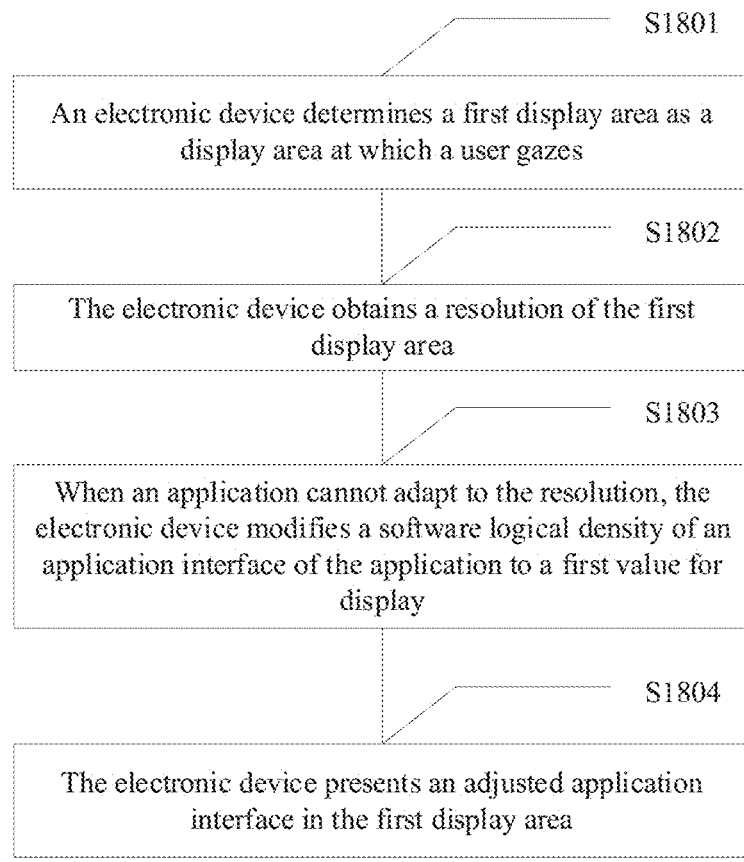
FIG. 18 is a schematic flowchart of a display method according to an embodiment of this application.

For the foregoing problem (3), an embodiment of this application provides a display method. As shown in FIG. 18, the method includes the following steps.

S1801: An electronic device determines a first display area as a display area at which a user gazes.

S1802: The electronic device obtains a resolution of the first display area.

For example, the first display area may be an entire display area in an expanded state, for example, the full screen shown in FIG. 3A, or may be a display area in a folded state, for example, the screen A or the screen B shown in FIG. 3B.

In an implementation, the electronic device may obtain the resolution of the first display area by invoking a DisplayInfo module.

In some possible implementations, before step S1801, the electronic device may detect a power-on signal, and start a system.

In some other possible implementations, before step S1501, the electronic device may detect that the user switches a display area of a mobile phone with a foldable screen from a second display area to the first display area. For example, as shown in FIG. 13B or FIG. 13C, the electronic device detects that the user folds a display screen, and switches the display area of the mobile phone with a foldable screen from an entire display area (which is equivalent to the second display area) in the expanded state to a display area (which is equivalent to the first display area) in the folded state. For another example, as shown in FIG. 13D, the electronic device detects that the user changes a handheld direction of the mobile phone with a foldable screen, and switches the display area of the mobile phone with a foldable screen from a display area (which is equivalent to the second display area) in the folded state to another display area (which is equivalent to the first display area). For still another example, as shown in FIG. 13E, the electronic device detects that the user expands a display screen, and switches the display area of the mobile phone with a foldable screen from a display area (which is equivalent to the second display area) in the folded state to an entire display area (which is equivalent to the first display area) in the expanded state.

S1803: When an application cannot adapt to the resolution, the electronic device modifies a software logical density (DensityDPI) of an application interface of the application to a first value for display, where the first value is determined based on the resolution of the first display area, and the application interface is an interface that is being presented in the second display area.

Figure 19:
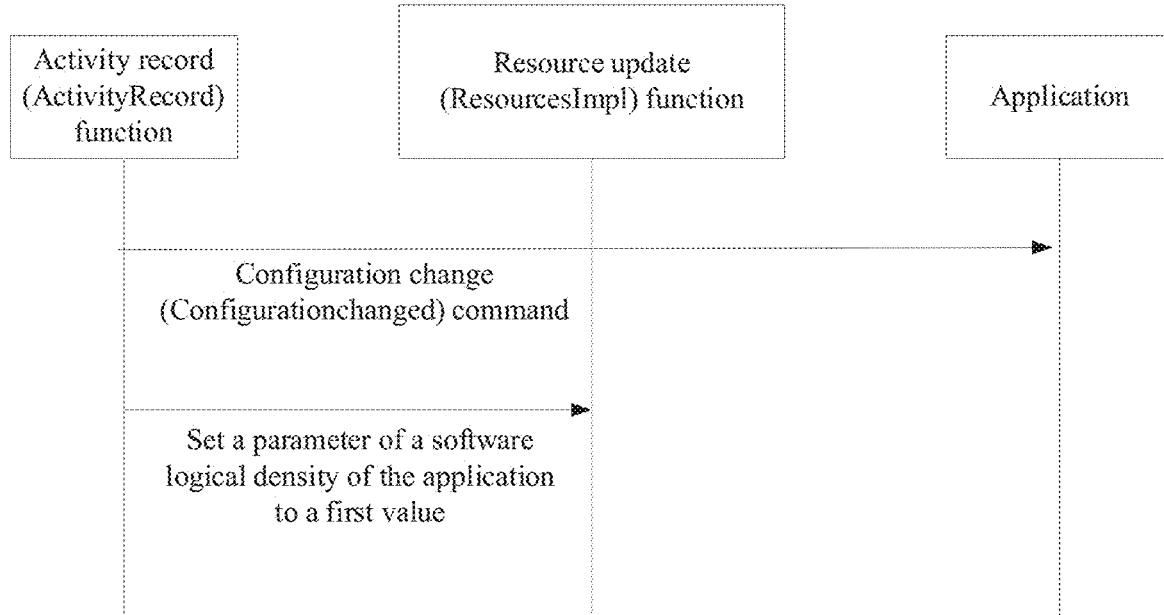
FIG. 19 is a schematic diagram of function call according to an embodiment of this application.

In an implementation, as shown in FIG. 19, the electronic device may send a configuration change (Configurationchanged) command to the application by calling an ActivityRecord function, to update a DensityDPI parameter of the application to the first value. Optionally, the electronic device may set the DensityDPI parameter of the application to the first value by calling a ResourcesImpl function when a resource of the application is updated.

S1804: The electronic device presents an adjusted application interface in the first display area.

In this embodiment of this application, when an application cannot adapt to a resolution of a display area, the Configurationchanged command is sent to the application, so that an application interface can be presented in the display area in a reconfiguration manner without restarting the application. Compared with a conventional technology in which a restart command is sent to an application when the application cannot adapt to a resolution of a display area, this embodiment of this application can ensure continuity of a life cycle of the application, to improve user experience. For example, the user watches a video in the second display area, and switches a playback interface of the video to the first display area when the video has been played for 1 minute and 30 seconds. If an application that plays the video cannot adapt to the resolution of the first display area, the electronic device may reconfigure a software logical density of the playback interface of the video at 1 minute and 30 seconds based on the resolution of the first display area, instead of restarting the application that plays the video, so that the user can continue to watch the video in the first display area. According to the method provided in this embodiment of this application, video interruption caused by application restart, unexpected exit, or the like can be avoided, thereby improving user experience.

In addition, in this embodiment of this application, when an application is updated, a DensityDPI parameter of the application is set to the first value, so that the application can adapt to the resolution of the first display area.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A display method, applied to an electronic device configured with a foldable screen, wherein the foldable screen comprises a first display area and a second display area, and wherein at least one of the following is true:

the first display area is a display area of the foldable screen in a folded state, and the second display area is another display area of the foldable screen in the folded state; or the first display area is a display area of the foldable screen in a folded state, and the second display area is an entire display area of the foldable screen in an expanded state; or the first display area is an entire display area of the foldable screen in an expanded state, and the second display area is another display area of the foldable screen in a folded state; and where the method comprises:
  determining the first display area as a display area at which a user gazes;
  obtaining information about a notch area of the first display area;
  adjusting a display area of an application interface based on the information about the notch area of the first display area, wherein the application interface is an interface that is being presented in the second display area, wherein the adjusting the display area comprises:
    obtaining a direction parameter of the display area;
    assigning a value of direction that matches with a gaze direction of the user to the direction parameter of the display area; and
    locking the direction parameter by calling a display function;
  presenting an adjusted application interface in the first display area by applying the direction parameter.

2. The method according to claim 1, wherein before the obtaining information about a notch area of the first display area, the method further comprises:
  detecting a power-on signal; or
  detecting that the application interface is switched from the second display area to the first display area.

3. The method according to claim 2, wherein the detecting that the application interface is switched from the second display area to the first display area comprises:
  detecting that the foldable screen is switched from the expanded state to the folded state, wherein the second display area is an entire display area of the foldable screen in the expanded state, and the first display area is a display area of the foldable screen in the folded state; or
  detecting that the foldable screen is switched from the folded state to the expanded state, wherein the second display area is a display area of the foldable screen in the folded state, and the first display area is an entire display area of the foldable screen in the expanded state.

4. A display apparatus, wherein the apparatus comprises:
  a foldable screen, wherein the foldable screen comprises a first display area and a second display area, and wherein at least one of the following is true:
    the first display area is a display area of the foldable screen in a folded state, and the second display area is another display area of the foldable screen in the folded state; or
    the first display area is a display area of the foldable screen in a folded state, and the second display area is an entire display area of the foldable screen in an expanded state; or
    the first display area is an entire display area of the foldable screen in an expanded state, and the second display area is another display area of the foldable screen in a folded state;
  at least one processor; and
  one or more memories coupled to the at least one processor and storing programming instructions for execution by the at least one processor to cause the apparatus to:
    determine the first display area as a display area at which a user gazes;
    obtain information about a notch area of the first display area;
    adjust a display area of an application interface based on the information about the notch area of the first display area, wherein the application interface is being presented in the second display area, wherein the adjust the display area comprises:
      obtain a direction parameter of the display area;
      assign a value of direction that matches with a gaze direction of the user to the direction parameter of the display area; and
    lock the direction parameter by calling a display function; and
    present an adjusted application interface in the first display area.

5. The apparatus according to claim 4, wherein the programming instructions, when executed by the at least one processor, cause the apparatus to: before obtaining information about a notch area of the first display area:
  detect a power-on signal; or
  detect that the application interface is switched from the second display area to the first display area.

6. The apparatus according to claim 5, wherein the programming instructions, when executed by the at least one processor, cause the apparatus to:
  detect that the foldable screen is switched from the expanded state to the folded state, wherein the second display area is an entire display area of the foldable screen in the expanded state, and the first display area is a display area of the foldable screen in the folded state; or
  detect that the foldable screen is switched from the folded state to the expanded state, wherein the second display area is a display area of the foldable screen in the folded state, and the first display area is an entire display area of the foldable screen in the expanded state.

7. One or more non-transitory computer-readable storage media storing computer instructions, that when executed by one or more processors, cause a computing device to perform operations, wherein the computing device a foldable screen and a processor, wherein the foldable screen comprises a first display area and a second display area, and wherein at least one of the following is true:
  the first display area is a display area of the foldable screen in a folded state, and the second display area is another display area of the foldable screen in the folded state; or
  the first display area is a display area of the foldable screen in a folded state, and the second display area is an entire display area of the foldable screen in an expanded state; or
  the first display area is an entire display area of the foldable screen in an expanded state, and the second display area is another display area of the foldable screen in a folded state;
and wherein the operations comprise:
  determining the first display area as a display area at which a user gazes;
  obtaining information about a notch area of the first display area;

adjusting a display area of an application interface based on the information about the notch area of the first display area, wherein the application interface is being presented in the second display area, wherein the adjusting the display area comprises:
  obtaining a direction parameter of the display area;
  assigning a value of direction that matches with a gaze direction of the user to the direction parameter of the display area; and
  locking the direction parameter by calling a display function; and
presenting an adjusted application interface in the first display area.

8. The one or more non-transitory computer-readable storage media according to claim 7, wherein the operations further comprise: before obtaining information about a notch area of the first display area:
  detecting a power-on signal; or
  detecting that the application interface is switched from the second display area to the first display area.

9. The one or more non-transitory computer-readable storage media according to claim 8, wherein the operations comprise:
  detecting that the foldable screen is switched from the expanded state to the folded state, wherein the second display area is an entire display area of the foldable screen in the expanded state, and the first display area is a display area of the foldable screen in the folded state; or
  detecting that the foldable screen is switched from the folded state to the expanded state, wherein the second display area is a display area of the foldable screen in the folded state, and the first display area is an entire display area of the foldable screen in the expanded state.

10. The method according to claim 1, further comprising:
  determining a reconfigured display parameter of the application interface based on the information about the notch area.

11. The method according to claim 10, wherein the display area is adjusted based on the reconfigured display parameter.

12. The apparatus according to claim 4, wherein the programming instructions, when executed by the at least one processor, cause the apparatus to: determine a reconfigured display parameter of the application interface based on the information about the notch area.

13. The apparatus according to claim 12, wherein the display area is adjusted based on the reconfigured display parameter.

14. The one or more non-transitory computer-readable storage media according to claim 7, the operations further comprising: determining a reconfigured display parameter of the application interface based on the information about the notch area.

15. The one or more non-transitory computer-readable storage media according to claim 14, wherein the display area is adjusted based on the reconfigured display parameter.

* * * * *